US007958070B2

(12) United States Patent
Mitarai et al.

(10) Patent No.: US 7,958,070 B2
(45) Date of Patent: Jun. 7, 2011

(54) PARAMETER LEARNING METHOD, PARAMETER LEARNING APPARATUS, PATTERN CLASSIFICATION METHOD, AND PATTERN CLASSIFICATION APPARATUS

(75) Inventors: Yusuke Mitarai, Tokyo (JP); Masakazu Matsugu, Yokohama (JP); Katsuhiko Mori, Kawasaki (JP); Kan Torii, Pittsburgh, PA (US); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 686 days.

(21) Appl. No.: 11/769,143

(22) Filed: Jun. 27, 2007

(65) Prior Publication Data

US 2008/0016016 A1     Jan. 17, 2008

(30) Foreign Application Priority Data

Jun. 30, 2006    (JP) ................. 2006-181896

(51) Int. Cl.
     *G06F 15/18*      (2006.01)
(52) U.S. Cl. ........................................ 706/25
(58) Field of Classification Search .............. 706/20–25; 382/155–254
See application file for complete search history.

(56) References Cited

U.S. PATENT DOCUMENTS

| | | | | |
|---|---|---|---|---|
| 2001/0036298 | A1* | 11/2001 | Yamada et al. | 382/118 |
| 2005/0047656 | A1* | 3/2005 | Luo et al. | 382/167 |
| 2006/0198554 | A1* | 9/2006 | Porter et al. | 382/159 |
| 2006/0228040 | A1* | 10/2006 | Simon et al. | 382/254 |
| 2008/0219516 | A1* | 9/2008 | Suzuki et al. | 382/118 |
| 2009/0324060 | A1* | 12/2009 | Sato et al. | 382/159 |

FOREIGN PATENT DOCUMENTS

| | | |
|---|---|---|
| JP | 2005-157679 A | 6/2005 |
| JP | 2005-284348 A | 10/2005 |

OTHER PUBLICATIONS

Schlokopf et al., Nonlinear Component Analysis as a Kernel Eigenvalue Problem, 1996, Max-Planck-Institut, pp. 1-18.*
Yang et al., Detecting Faces in Images: A Survey, IEEE Transactions on Pattern Analysis and MAchie Learning, vol. 24, No. 1, Jan. 2002, pp. 1-25.*
Zhao et al. Face Recognition: A Literature Survey, ACM Computing Surveys, vol. 35, Dec. 4, 2003, pp. 399-458.*
Viola et al., Rapid Object Detection using a Boosted Cascade of Simple Features, Accepted Conference on Computer Vision and PAttern Recognition, 2001, pp. 1-9.*

(Continued)

*Primary Examiner* — David R Vincent
(74) *Attorney, Agent, or Firm* — Canon USA, Inc. IP Div

(57) ABSTRACT

A plurality of pieces of learning data, each associated with a class to which the piece of the learning data belong, are input. In each piece of the learning data, a statistical amount of attribute values of elements in each of specific k parts, k being equal to or larger than 1, is calculated. Each piece of the learning data is mapped in a k-dimensional feature space as a vector having the calculated k statistics amounts as elements. Based on each piece of the mapped learning data and the classes to which the pieces of learning data belong, parameters for classifying input data into one of the plurality of classes are learned in the k-dimensional feature space. By using the parameters, pattern classification can be performed with high speed and high accuracy.

20 Claims, 11 Drawing Sheets

OTHER PUBLICATIONS

Luca et al., Fusion of LDA and PCA for Face Verification, Biometric Authentication, LNCS 2359, pp. 30-37, 2002.*
Hearst, Marti, Support Vector Machines, 1998, IEEE Intelligent Sytems, vol. 13, No. 4, pp. 18-28.*
A Method of Constructing a Dictionary for Facial Image Recognition Independent of Facial Direction, p. 1639-1649, Nov. 25, 1995, Satoshi shimada, Hideki Koike, Akira Tomono, Kenichiro Ishii.
Face Tracking by Maximizing Classification Score of Face Detector Based on Rectangle Features, p. 55-60, Oct. 21, 2005, Akinori Hidaka, Kenji Nishida, Takio Kurita.
Face Detection and Tracking Using SSR Filter and SVM, p. 47-52, Nov. 13, 2003, Shinjiro Kawato, Nobuji Tetsutani.
A Face Detection Method based on Selection and Generation of High Dimensional Features, p. 115-120, Mar. 11, 2004, Junya Arakawa, Ken'ichi Morooka, Hiroshi Nagahashi.
Face detection based on Generalized LVQ, p. 47-52, Feb. 13, 2003,Toshinori Hosoi, Tetsuaki Suzuki, Atsushi Sato.
Overview of Support Vector Machine, p. 2-8, Jun. 25, 2000, Koji Tsuda.

* cited by examiner

PARAMETER LEARNING METHOD, PARAMETER LEARNING APPARATUS, PATTERN CLASSIFICATION METHOD, AND PATTERN CLASSIFICATION APPARATUS

BACKGROUND OF THE INVENTION

1. Field of the Invention

The present invention relates to learning of parameters for classifying a pattern of an input signal and pattern classification using this learning in recognition of images and voices.

2. Description of the Related Art

Many methods have been suggested as a pattern classification method for classifying input data into a predetermined class in optical character recognition or automatic voice recognition. Also, under present circumstances, various new methods are suggested for the purpose of an increase in processing speed and enhancement of classification accuracy.

For example, a high-speed and high-accuracy pattern classification method has been suggested based on a combination of a learning method by AbaBoost and a cascade classification method of a weak discrimination method, which enables very high speed operation (see P. Viola, M. Jones, "Rapid Object Detection using a Boosted Cascade of Simple Features", Proc. IEEE Conf. on Computer Vision and Pattern Recognition, Vol. 1, pp. 511-518, December 2001).

Also, for the purpose of further increasing speed and accuracy in the pattern classification method, a method of introducing a boosting method has been suggested (see R. O. Duda, P. E. Hart, D. G. Stork, "Pattern Classification Second Edition", ShinGijutsu Communications K.K. pp. 478-482, July 2001). Other methods include a real AbaBoost method (see R. E. Schapire, Y. Singer, "Improved Boosting Algorithms Using Confidence-rated Predictions", Machine Learning, Vol. 37, pp. 297-336, December 1999) and a nested cascade classification method (see Rou Sekou, Takayoshi Yamashita, Takuya Okamoto, Masahito Kawade "Fast Omni-Directional Face Detection", MURU 2004, Vol. 2, pp. 271-276, July 2004).

Also, a pattern recognition method called a support vector machine (SVM) capable of configuring a nonlinear classification function is known (see Kouji Tsuda "Technical survey: Overview of Support Vector Machine", The Journal of the Institute of Electronics, Information, and Communication Engineers, Vol. 83, pp. 460-466, June 2000).

In such a background of higher performance of processing apparatuses, a technique enabling real-time pattern classification of high speed and high accuracy has been required.

SUMMARY OF THE INVENTION

The present invention provides a parameter learning method for high-speed and high-accuracy pattern classification and a pattern classification method using the learned parameters.

According to one aspect, the present invention relates to a parameter learning method for classifying input data into one of a plurality of classes. The parameter learning method includes inputting a plurality of pieces of learning data, each associated with a class to which the piece of learning data belongs; calculating a statistical amount of attribute values of elements in each of specific k parts, k being equal to or larger than 1, in each piece of the learning data; mapping each piece of the learning data in a k-dimensional feature space as a vector having the calculated k statistical amounts as elements; optimizing parameters to classify the input data into one of the plurality of classes in the k-dimensional feature space based on each piece of the learning data mapped in the k-dimensional feature space and the classes to which the pieces of the learning data belong to.

According to another aspect, the present invention relates to a parameter learning apparatus for classifying input data into one of a plurality of classes. The parameter learning apparatus includes a learning data input unit configured to input a plurality of pieces of learning data, each associated with a class to which the piece of the learning data belongs; a calculating unit configured to calculate a statistical amount of attribute values of elements in each of specific k parts, k being equal to or larger than 1, in each piece of the learning data; a mapping unit configured to map each piece of the learning data in a k-dimensional feature space as a vector having the calculated k statistical amounts as elements; and a learning unit configured to optimize parameters to classify the input data into one of the plurality of classes in the k-dimensional feature space based on each piece of the learning data mapped in the k-dimensional feature space and the classes to which the pieces of the learning data belong to.

According to still another aspect, the present invention relates to a computer-readable medium containing computer-executable instructions for controlling a computer to perform parameter optimization for classifying input data into one of a plurality of classes. The medium includes computer-executable instructions for inputting a plurality of pieces of learning data, each associated with a class to which the piece of the learning data belongs; computer-executable instructions for calculating a statistical amount of attribute values of elements in each of specific k parts, k being equal to or larger than 1, in each piece of the learning data; computer-executable instructions for mapping each piece of the learning data in a k-dimensional feature space as a vector having the calculated k statistical amounts as elements; and computer-executable instructions for optimizing parameters to classify the input data into one of the plurality of classes in the k-dimensional feature space based on each piece of the learning data mapped in the k-dimensional feature space and the classes to which the pieces of the learning data belong.

Other advantages besides those discussed above shall be apparent to those skilled in the art from the description of embodiments of the present invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

Hereinafter, numerous embodiments, features and aspects of the present invention are described in detail with reference to the attached drawings.

First Exemplary Embodiment

A first embodiment of the present invention describes a parameter learning method used in a pattern classification method for determining whether input image data belongs to a specific category, and a pattern classification method using the parameter learning method. In this embodiment, two-dimensional image data is used as the input image data. In this pattern classification method, input image data is classified into one of two classes: the first class is that the image data belongs to a specific category; and the second class is that the image data does not belong to the specific category.

The specific category is, for example, a human face or a defect of a part. In this embodiment, a pattern where the center of a human face is positioned at almost the center of an input image (hereinafter referred to as a face pattern) is used as the specific category.

Figure 1:
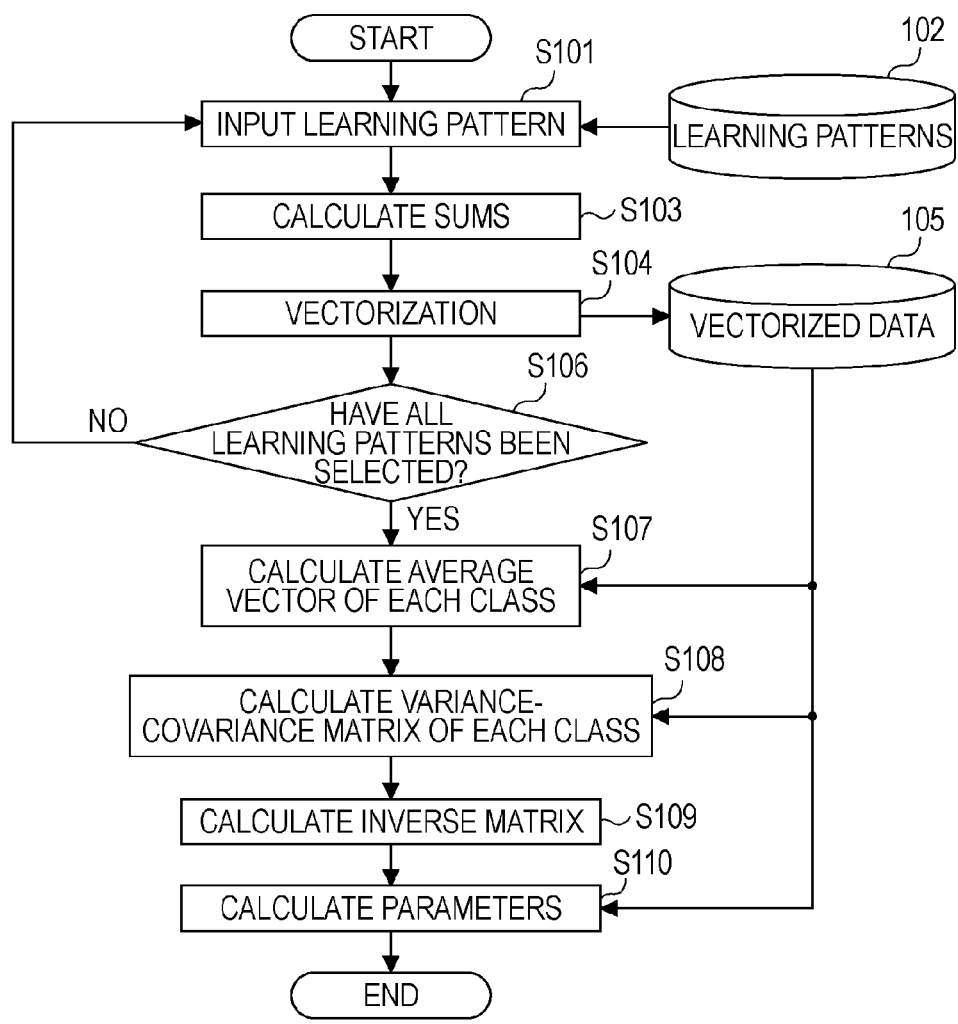
FIG. 1 is a flowchart showing an example process of optimizing parameters for pattern classification according to a first exemplary embodiment of the present invention.

FIG. 1 is a flowchart showing a parameter learning/optimization method for pattern classification according to the first embodiment. Hereinafter, the parameter learning method for pattern classification is described with reference to FIG. 1.

First, in step S101, one of a plurality of learning patterns held in a database 102 is input. Face patterns and other arbitrary patterns (hereinafter referred to as non-face patterns) are held in advance in the database 102 together with their labels (indicating a face pattern or a non-face pattern). In this embodiment, the patterns held in the database 102 are gray-scale images, in which each pixel value is indicated as a luminance value. Herein, the orientation and size of a face is normalized to some extent in all of the face patterns, and all of the patterns including the face and non-face patterns are held in a uniform image size.

Then, in step S103, the sum of luminance values in each of four predetermined parts is obtained in the learning pattern input in step S101. The predetermined parts can be arbitrarily set. For example, the parts can be set so that a significant difference can be seen there between the two classes used in the classification. In this embodiment, input image data is classified into a face pattern class or a non-face pattern class, and thus areas of right and left eyes, an area between eyebrows, and an area of a mouth, which are characteristic in a face pattern, are set as the four predetermines parts.

Figure 2:
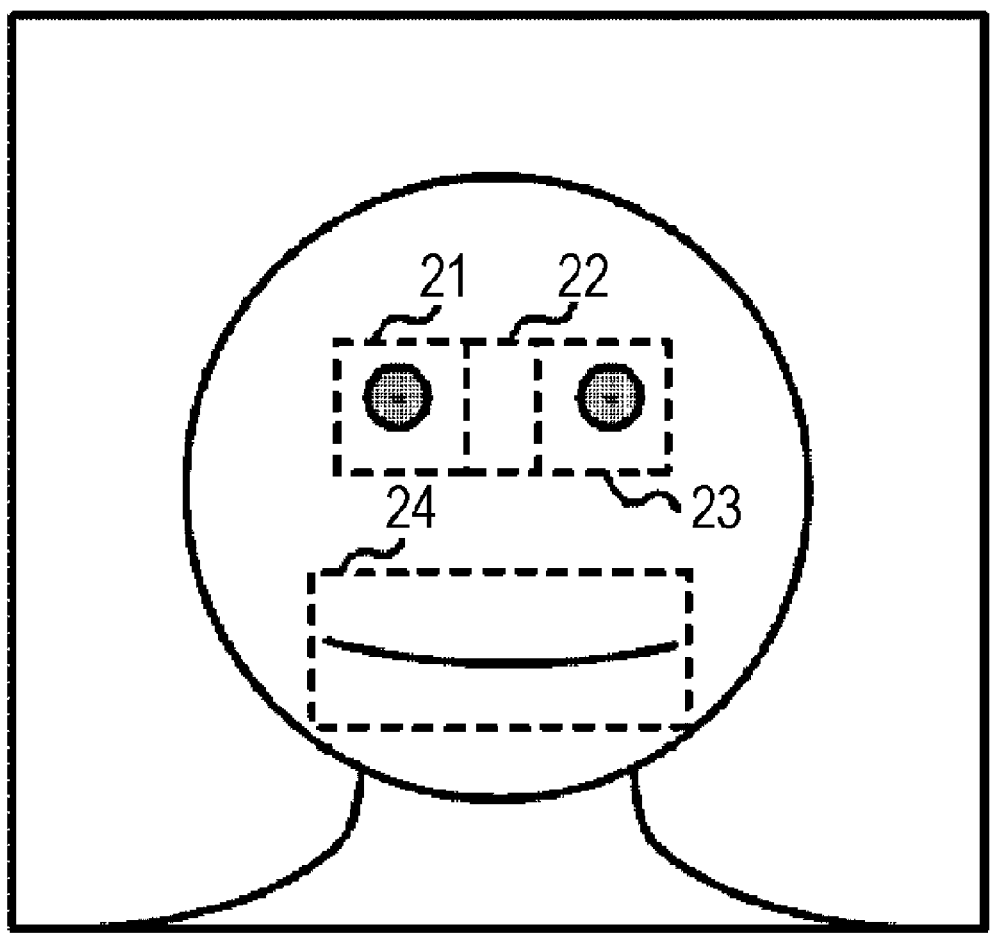
FIG. 2 shows an example of an image having ranges where a sum is calculated.

Specifically, as defined by broken lines shown in FIG. 2, four rectangular areas: an area 21 including the left eye of an entire face pattern; an area 23 including the right eye of the entire face pattern; an area 22 between the areas 21 and 23; and an area 24 including the mouth of the entire face pattern, are used as the predetermined parts. Although the four rectangular areas are used as the predetermined parts in this embodiment, the number, position, size, and shape of the predetermined parts can be arbitrarily set. For example, at least one part is set and the sum of luminance values in the part is calculated.

In step S104, a vector is generated by simply arranging the sums in the respective areas calculated in step S103. The sums may be arbitrarily arranged. In this embodiment, the sums are arranged in the order of the area 21, the area 22, the area 23, and the area 24 shown in FIG. 2. The generated vector is held as vectorized data in a database 105 together with the label of the learning pattern. Accordingly, each learning pattern is mapped in a four-dimensional feature space defined by the above-described four sums.

In step S106, it is determined whether all of the learning patterns held in the database 102 have been selected. If not all of the learning patterns have been selected, the process returns to step S101, where another learning pattern is selected from the database 102. If all of the learning patterns have been selected, the process proceeds to step S107.

In step S107, an average vector of each class is calculated by using the vector data held in the database 105.

In step S108, a variance-covariance matrix of each class is calculated by using the average vector of each class calculated in step S107 and the vector data held in the database 105.

In step S109, the variance-covariance matrix of each class calculated in step S108 is multiplied by a priori probability of the class, the sum of the matrixes is calculated, and an inverse matrix of the obtained matrix is calculated. If the priori probability of each class is known, the known priori probability may be used. If unknown, the priori probability may be set in accordance with the number of learning patterns or the performance required to a classifier that wants to learn. If no inverse matrix exists, that is, if the sum of the matrixes is a singular matrix, there is a high possibility that the parts where the sums are calculated in step S103 are not appropriately set. In that case, the learning is performed again after appropriately setting the predetermined parts, that is, by changing the position and size of each area shown in FIG. 2.

Finally, in step S110, a class separating vector, which is one of parameters for pattern classification, is calculated by using the average vector of each class calculated in step S107 and the inverse matrix calculated in step S109. The class separating vector can be calculated by subtracting the average vector of the non-face pattern class from the average vector of the face pattern class and by multiplying the difference vector from the left by the inverse matrix calculated in step S109.

Then, the other parameter for pattern classification, that is, a classification threshold, is calculated by using the class separating vector and the vector data held in the database 105. First, an inner product of all vector data held in the database 105 and the class separating vector is calculated. The inner product value can be regarded as a representative value representing the likelihood of a face pattern. For example, if the inner product value is equal to or larger than a predetermined value, the input data is classified into the face pattern class. Otherwise, the input data is classified into the non-face pattern class. The predetermined value used for classification is the classification threshold.

The classification threshold may be determined by changing the classification threshold in small steps so as to find the value with which the total number of errors (the sum of the number of times the input data is wrongly classified into the non-face pattern class and the number of times the input data is wrongly classified into the face pattern class) is the smallest.

In this embodiment, the classification threshold is determined based on the total number of errors. However, the determining method is not limited to this method, but the classification threshold may be appropriately set in accordance with the performance required to the classifier. Depending on the direction of the class separating vector, the total number of errors can be reduced by classifying the input data into the face pattern class if the inner product value is equal to or smaller than the predetermined threshold. In that case, the direction of the class separating vector is reversed (reverse the signs of all elements). Alternatively, a rule may be set so that the predetermined value or less corresponds to the face pattern class at pattern classification.

With the above-described method, the class separating vector and the classification threshold can be obtained as the parameters for pattern classification. These parameters provide a so-called linear discriminant function and a boundary between the classes. In this embodiment, the above-described so-called linear discriminant analysis is used to obtain the class separating vector. However, the present invention is not limited to this method, but the class separating vector can be obtained by appropriately updating the parameters in orthogonalization learning or the like.

Figure 3:
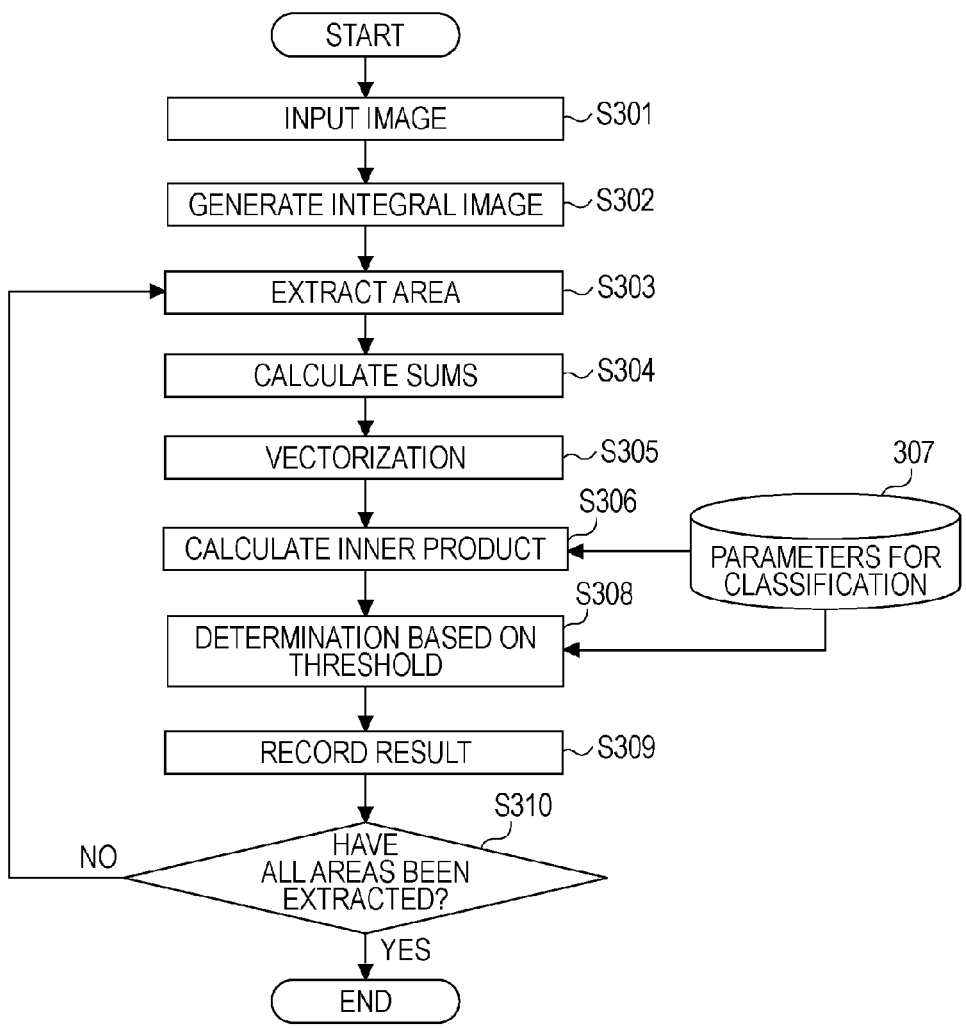
FIG. 3 is a flowchart showing a face detecting process according to the first embodiment.

An exemplary method for detecting a face in an image by the pattern classification method using the parameters for pattern classification obtained in the above-described manner is now described with reference to FIG. 3.

In step S301, an image from which a face is to be detected is input. This image is a grayscale image as the image used in the above-described parameter learning for pattern classification. When a face is to be detected from an image other than a grayscale image, the image is input after being transformed to a grayscale image.

In step S302, an integral image of the input image is generated in order to rapidly calculate a sum in each rectangular area. The integral image is an image in which the sum of pixel values in a rectangular area having a diagonal line extending from the start point of the image (e.g., the pixel at the upper left corner of the image) to a target pixel is expressed as the pixel value of the target pixel. By using the integral image, the sum of pixel values in an arbitrary rectangular area can be rapidly calculated (for details of the integral image, see the above-mentioned document "Rapid Object Detection using a Boosted Cascade of Simple Features"). In this embodiment, the sum of pixel values is calculated in each of the four rectangular areas in step S304. The process of calculating the sums can be performed more rapidly by generating the integral image in advance.

In step S303, one of predetermined points in the image is set, and an area including the set point at the center is extracted from the generated integral image. As described below, steps S303 to S310 are sequentially performed on each of the above-described predetermined points. All pixels in the image may be set as the predetermined points. Alternatively, sampling may be roughly performed, for example, every other pixel. The size of the extracted area may be arbitrarily set, but in this embodiment, the size is the same as that of the learning pattern used in the classification parameter optimization method.

In step S304, the sum of pixel values is calculated in each of the rectangular areas at the same position as that of the areas where the sum is calculated in step S103 in the classification parameter optimization method, by using the extracted integral image.

In step S305, a vector is generated by arranging the sums calculated in step S304 in the same order as in step S104 in the classification parameter optimization method.

In step S306, an inner product of the vector generated in step S305 and the class separating vector that is generated in the classification parameter optimization method and that is held in a database 307 for parameters for classification is calculated. The class separating vector used here is directed so that vectors having an inner product greater than a predetermined value are classified into the face pattern class.

In step S308, the inner product value calculated in step S306 is compared with the classification threshold that is calculated in the classification parameter optimization method and that is held in the database 307. If the inner product value is larger than the classification threshold, it is determined that a face exists at the point set in step S303.

If it is determined in step S308 that a face exists, a result that the face exists at the point set in step S303 is recorded in step S309.

In step S310, it is determined whether all areas having the predetermined points at the center have been extracted in step S303. If all areas have been extracted, the process ends. Otherwise, the process returns to step S303, where another predetermined point is set and the corresponding area is extracted.

With the above-described process, a face can be detected from the input image. In this process, a face having substantially the same orientation and size as those of the face pattern used in the classification parameter optimization step can be detected. When a face of a different size is to be detected, the input image is scaled up or down and the same process may be performed. Alternatively, the predetermined parts where the sums are calculated in step S304 may be scaled up or down and a vector may be generated in step S305 by performing correction in accordance with the scaling up or down.

Specifically, the correction is performed by multiplying each of the sums by the reciprocal of the area ratio of the scaling up or down. When a face of a different orientation of in-plane rotation from the learning pattern is to be detected, the image is input after rotating it and the same process may be performed. If the axial rotation of the face to be detected is significantly different from the learning pattern, it is difficult to detect the face by the same pattern classification method. For such a case, parameters for pattern classification of each axial rotation may be generated in the classification parameter optimization step, so that a face can be detected by independently using the respective pattern classification methods.

In the first embodiment, a classification parameter optimization method has been described which is used in a pattern classification method for determining whether input image data belongs to a specific category. In this embodiment, two-dimensional image data is used as the input image data. In this pattern classification method, the input image data is classified into one of two classes: the first class being that the image data belongs to a specific category; and the second class being that the image data does not belong to the specific category.

Second Exemplary Embodiment

In the second embodiment, as in the first embodiment, pattern classification into two classes is performed by using two-dimensional image data as input data. In the parameter learning method (i.e. the classification parameter optimization method) and the pattern classification method according to the second embodiment, pattern classification with higher accuracy can be realized by combination of a plurality of weak discriminators established by using a boosting method (for details, see the above-mentioned document "Pattern Classification Second Edition").

Figure 4:
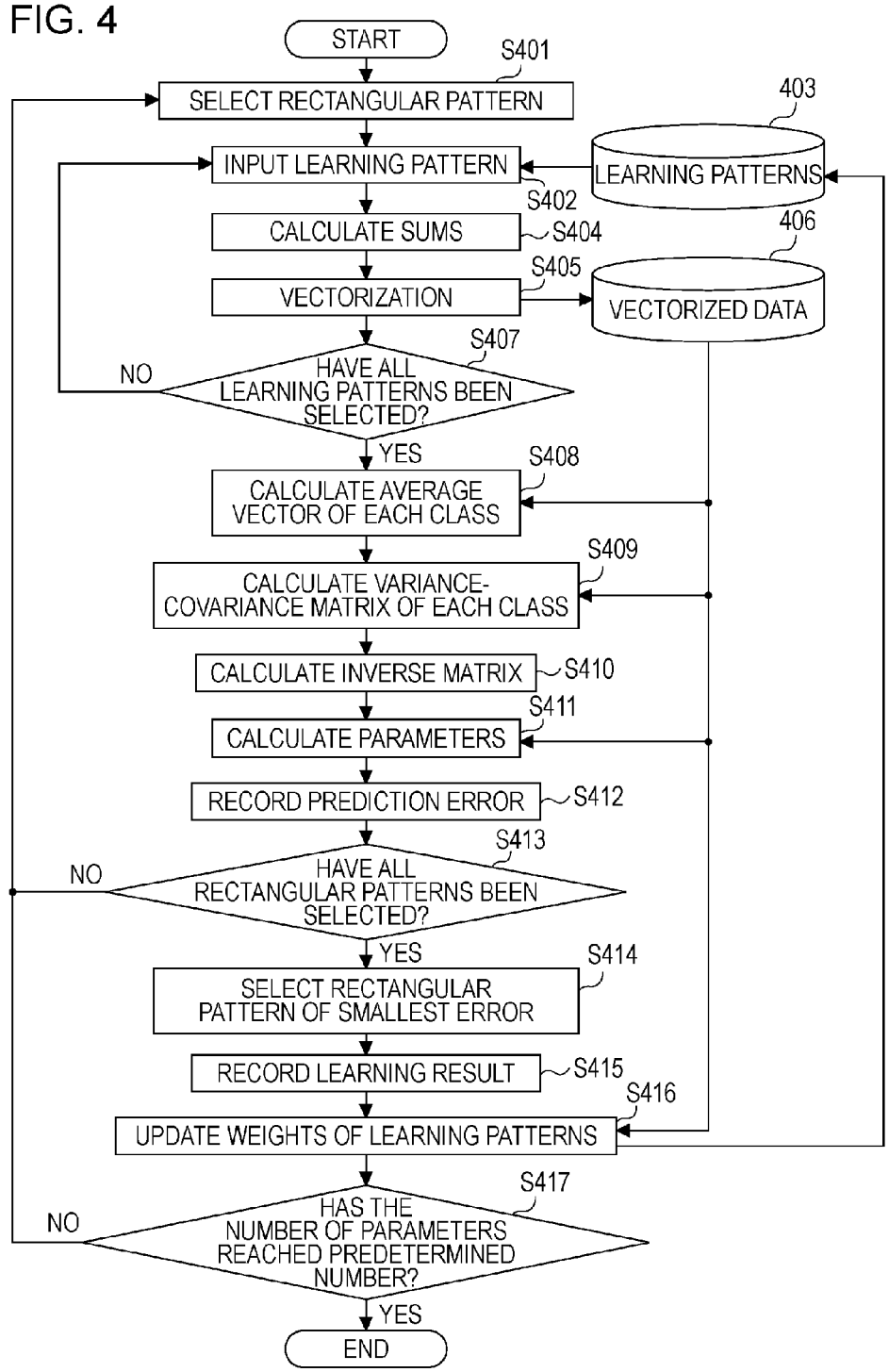
FIG. 4 is a flowchart showing a process of optimizing parameters for pattern classification according to a second exemplary embodiment.

FIG. 4 is a flowchart showing a classification parameter optimization process for pattern classification according to the second embodiment.

In step S401, one of a plurality of predetermined rectangular patterns is selected. The rectangular pattern selected here is equivalent to the rectangular areas corresponding to the positions of the eyes and the mouth in the first embodiment. Note that, in this embodiment, fixed rectangular pattern is not used, but a process is performed on each of a plurality of predetermined rectangular patterns and the rectangular pattern providing a pattern classification result of the highest classifying ability is selected. As the plurality of predetermined rectangular patterns, combinations of rectangular areas of arbitrary position and size may be used.

The method for setting the rectangular patterns according to this embodiment is further described below. In this embodiment, face and non-face patterns of 20×20 pixels are used as learning patterns in the classification parameter optimization method. Two rectangular areas are set in the pattern of 20×20 pixels, and the two rectangular areas are used as a rectangular pattern. Each rectangle is defined by the width, the height, the position in the vertical direction, and the position in the horizontal direction. Thus, each rectangular area is set by determining these four parameters.

The width w of the rectangle is determined to be between 1 and 20, and the height h is determined to be between 1 and 20. Then, the coordinate position x of the upper left corner of the rectangle is determined to be between 0 and 20-w, and the coordinate position y of the upper left corner is determined to be between 0 and 20-h. Accordingly, one rectangular area is set. In this embodiment, a combination of two rectangular areas is used as a rectangular pattern, and thus the other rectangular area is set in the same manner. However, the second rectangular area is different from the first rectangular area.

All of these combinations may be used as the predetermined rectangular patterns. In that case, however, it takes much time to perform the process. For this reason, the number of predetermined rectangular patterns may be restricted, for example, each of the width and height is set to be an odd number and the coordinate position at the upper left corner of the rectangle is set to be an even number.

In this embodiment, each rectangular pattern includes two rectangular areas. However, the present invention is not limited to this, but the number of rectangular areas included in each rectangular pattern may be other than two. For example, when the rectangular pattern includes three rectangular areas, a rectangular area other than first and second rectangular areas may be determined as a third rectangular area in the above-described manner. The rectangular pattern may include only one rectangular area. In that case, a method for obtaining parameters for pattern classification is different, which is described below. In the present embodiment, every rectangular pattern includes two rectangular areas. Alternatively, a rectangular pattern including two rectangular areas and a rectangular pattern including three rectangular areas may be mixed.

After the rectangular pattern is selected in step S401, the process proceeds to step S402, where one of a plurality of learning patterns held in a database 403 is input. The patterns held in the database 403 are the same as in the first embodiment. Note that, in this embodiment, a weight is set in each pattern.

The weight indicates the importance—as the weight is heavier, greater importance is placed on the pattern in the classification parameter optimization method. Typically, the same weight is set in each pattern in an initial stage. That is, when the total number of patterns is N, a weight of 1/N is set in each pattern. The setting of the weights in the initial stage is not limited to this, but graded weights may be set in accordance with a priori probability, for example. Alternatively, the weights may be appropriately set in accordance with a required performance of a classifier.

For example, when a large weight is set in a non-face pattern, the possibility that a non-face pattern is wrongly classified into a face pattern class can be decreased (in that case, however, the possibility that a face pattern is wrongly classified into a non-face pattern class increases). An absolute value of the weight is not limited, but may be set so that the sum of weights of all learning patterns is 1 for easy calculation.

In step S404, the sum of luminance values in each rectangular area is calculated based on the rectangular pattern selected in step S401 in the learning pattern input in step S402.

In step S405, a vector is generated by using the sums in the respective rectangular areas calculated in step S404, and the vector is held as vector data corresponding to the rectangular pattern selected in step S401 in a database 406.

Unlike in the first embodiment, the calculated sums are normalized, which are used as element values of the vector, for enhancement in the classification ability. Specifically, an average of luminance values in the learning pattern input in step S402 and standard deviation of the luminance values are used. First, the area of each rectangular area is multiplied by the average of the luminance values, and each of the products is subtracted from the sum in the corresponding rectangular area. Each of the values calculated in this way is multiplied by the reciprocal of the standard deviation. Accordingly, the normalization is performed. The normalized sums in the respective rectangular areas are arranged in an arbitrary order (the same order in each rectangular pattern) to generate a vector, which is held in the database 406.

In step S407, it is determined whether all of the learning patterns held in the database 403 have been selected. If not all of the learning patterns have been selected, the process returns to step S402, where another learning pattern is selected from the database 403. If all of the learning patterns have been selected, the process proceeds to step S408 to calculate an average vector of each class.

In step S408, a weighted average vector of each class is calculated by using the vector data that is held in the database 406 and that corresponds to the rectangular pattern selected in step S401. Specifically, each vector data is multiplied by the above-described weight of the corresponding learning pattern, and the sum of vectors multiplied by the weight is calculated in each class. At the time, the sum of the weights of the learning patterns is calculated in each class. Then, the sum of the vectors in each class is divided by the sum of the weights of the class, so that the weighted average vector of each class can be obtained.

Then, in step S409, a weighted variance-covariance matrix of each class is calculated by using the weighted average vector of each class calculated in step S408 and the vector data that is held in the database 406 and that corresponds to the rectangular pattern selected in step S401. Herein, the weights of the learning patterns are used to calculate the weighted variance-covariance matrix of each class.

Specifically, from a piece of the vector data, the weighted average vector of the class corresponding to the vector data is subtracted, and the vector obtained by the subtraction is multiplied by the transposed vector thereof. Then, the matrix obtained by the multiplication is multiplied by the weight of the corresponding learning pattern, and the sum of matrixes multiplied by the weight is calculated in each class. Accordingly, the weighted variance-covariance matrix of each class can be obtained. When the rectangular pattern selected in step S401 includes only one rectangular area, the vector data has only one element, so that the calculation of the variance-covariance matrix in step S409 can be omitted. When step S409 is omitted, calculation of an inverse matrix in step S410 is also omitted.

In step S410, the sum of the weighted variance-covariance matrixes of the respective classes calculated in step S409 is calculated, and the inverse matrix of the matrix is calculated. Unlike in the first embodiment, the variance-covariance matrixes calculated in step S409 are weighted and the sum of the weights of all the learning patterns is 1, and thus multiplication of a priori probability is unnecessary. If no inverse matrix exists, that is, if the sum of the matrixes is a singular matrix, there is a high possibility that the rectangular pattern selected in step S401 is inappropriate. In that case, calculation of parameters in step S411 is skipped and the process proceeds to step S412, where the rectangular pattern is recorded together with data of a prediction error of 1 (details are described below), and the process proceeds to the subsequent step.

In step S411, a class separating vector, which is one of the parameters for pattern classification, is calculated by using the weighted average vector of each class calculated in step S408 and the inverse matrix calculated in step S410. The class separating vector can be calculated by subtracting the weighted average vector of the non-face pattern class from the weighted average vector of the face pattern class and by multiplying the difference vector from the left by the inverse matrix calculated in step S410.

Then, the other parameter for pattern classification, that is, a classification threshold, is calculated by using the class separating vector and the vector data that is held in the database 406 and that corresponds to the rectangular pattern selected in step S401. First, as in the first embodiment, an inner product of all vector data that is held in the database 406 and that corresponds to the rectangular pattern selected in step S401 and the class separating vector is calculated. The inner product value can be regarded as a representative value representing the likelihood of a face pattern, as in the first embodiment.

The method for determining the classification threshold is different from that in the first embodiment. That is, the classification threshold is determined in accordance with the weights of the learning patterns. Specifically, the classification threshold is changed in small steps, the weights of the patterns where a classification error occurs are accumulated as a cumulative value for all of the learning patterns, and the classification threshold with which the cumulative value is the smallest is searched for. Herein, the pattern where a classification error occurs is a learning pattern which is a face pattern and is wrongly classified into the non-face pattern class or a learning pattern which is a non-face pattern and is wrongly classified into the face pattern class. If the above-described cumulative value is small, that means the number of classification errors is small in the learning pattern on which importance should be placed presently. Accordingly, classification parameter optimization based on the weights of the learning patterns can be performed.

On the other hand, if the rectangular pattern selected in step S401 includes only one rectangular area and if the calculation of a variance-covariance matrix in step S409 is omitted, the method for calculating the parameters is different from that described above. First, only the sign is found of the value obtained by subtracting the weighted average vector (scalar, because the number of elements is 1) of the non-face pattern class from the weighted average vector (scalar) of the face pattern class. Then, all vector data (scalar) corresponding to the rectangular pattern selected in step S401 held in the database 406 is multiplied by this sign, and the calculated value is regarded as equivalent to the inner product value described above. Accordingly, a classification threshold and a cumulative value of errors may be calculated.

Then, in step S412, the parameters for pattern classification obtained in step S411 are recorded. Also, the cumulative value of errors used to determine the classification threshold is recorded as a prediction error.

In step S413, it is determined whether all of the predetermined rectangular patterns have been selected in step S401. If not all of the rectangular patterns have been selected, the selection history of the learning patterns is cleared and the process returns to step S401, where another rectangular pattern is selected. If all of the predetermined rectangular patterns have been selected, the process proceeds to step S414.

In step S414, the rectangular pattern having the smallest prediction error is selected based on the prediction errors recorded in step S412 from all the rectangular patterns selected in step S401.

In step S415, the rectangular pattern selected in step S414, the parameters for pattern classification corresponding thereto, and a classification score $\alpha$ calculated based on the prediction error are recorded as parameters used in a weak discrimination method. The classification score $\alpha$ can be calculated by using the expression $\alpha=1/2\times\ln\{(1-\epsilon)/\epsilon\}$, where $\epsilon$ is the prediction error in in the expression represents a natural logarithm.

Then, in step S416, the weights of the learning patterns held in the database 403 are updated. Herein, classification is actually performed on all vector data corresponding to the rectangular pattern recorded in step S415 held in the database 406, by using the parameters for pattern classification (class separating vector and classification threshold) recorded in step S415.

In the pattern where classification is successfully performed, the weight of the pattern is multiplied by $\exp(-\alpha)$. In the pattern where classification is not successfully performed, the weight of the pattern is multiplied by $\exp(\alpha)$. Herein, the pattern where classification is successfully performed means a learning pattern which is a face pattern correctly classified into the face pattern class or a learning pattern which is a non-face pattern correctly classified into the non-face pattern class. On the other hand, the pattern where classification is not successfully performed means a learning pattern which is a face pattern wrongly classified into the non-face pattern class or a learning pattern which is a non-face pattern wrongly classified into the face pattern class. $\alpha$ in the above-described expression is the classification score obtained in step S415. After the weights have been updated, normalization is performed so that the sum of the weights of all of the learning patterns held in the database 403 becomes 1.

Finally, in step S417, it is determined whether the number of the parameters recorded in step S415 has reached the predetermined number. If the number has reached the predetermined number, the process ends. If not reached, a rectangular pattern selection history, a learning pattern selection history, and the vectorized data in the database 406 are cleared and the process returns to step S401, where a rectangular pattern is selected. Accordingly, the parameters for pattern classification, that is, a predetermined number of rectangular patterns and the parameters for pattern classification corresponding to the rectangular patterns, can be obtained as the parameters used in each weak discrimination method.

In this embodiment, as in the first embodiment, the class separating vector is obtained by using linear discriminant analysis using weighted patterns. However, other methods may be used as an alternative or in addition.

Figure 5:
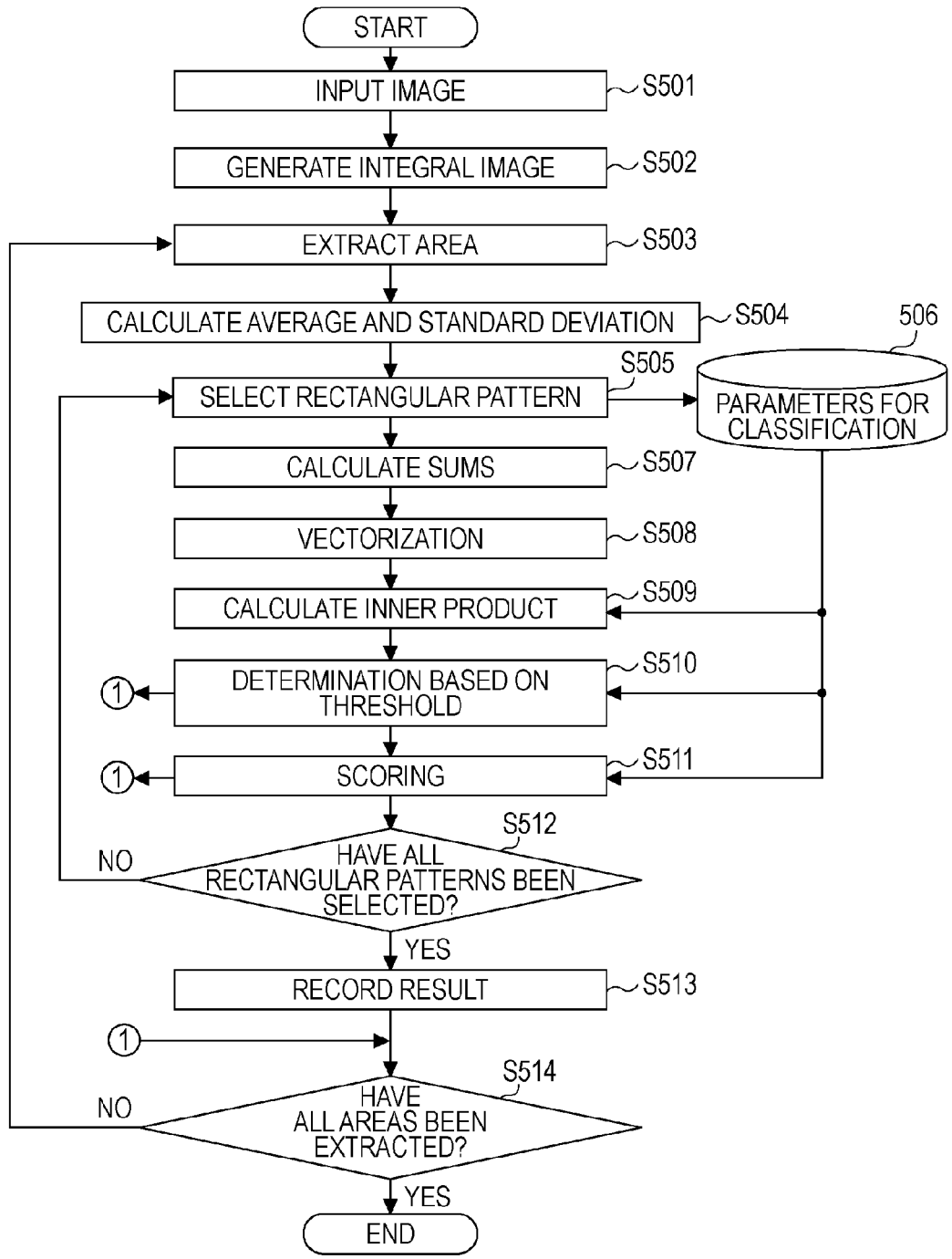
FIG. 5 is a flowchart showing a face detecting process according to the second embodiment.

Next, a method for detecting a face from an image is described with reference to FIG. 5. This method uses a pattern classification method based on a combination of a plurality of weak discrimination methods, using the parameters for pattern classification in the weak discrimination method obtained in the above-described manner.

First, in step S501, an image from which a face is to be detected is input. This image is a grayscale image as in the above-described parameter learning for pattern classification. When a face is to be detected from an image other than the grayscale image, the image is input after being transformed to a grayscale image.

Then, in step S502, the integral image, which is described in the face detecting method according to the first embodiment, is generated. Also, a square integral image is generated. In the square integral image, the sum of the square of respective pixel values in a rectangular area having a diagonal line extending from the start point of the image (e.g., the pixel at the upper left corner of the image) to a target pixel is represented as the pixel value of the target pixel. By using this, the sum of the square of respective pixel values in an arbitrary rectangular area can be rapidly calculated. By using the square integral image and the normal integral image, the standard deviation of an arbitrary rectangular area can be rapidly calculated.

Then, in step S503, one of predetermined points in the image is set, and a rectangular area including the set point at the center is extracted from the generated integral image. All pixels in the image may be set as the predetermined points. Alternatively, sampling may be roughly performed, for example, every other pixel. The size of the extracted area may be arbitrarily set, but in this embodiment, the size is the same as that of the learning pattern used at the optimization stage. After the one point has been set, the score used to determine whether a face exists at the point is set to 0.

Then, in step S504, an average pixel value and standard deviation of the area corresponding to the rectangular area extracted in step S503 in the image input in step S501 are calculated. The average can be calculated by calculating the sum of the pixel values in the rectangular area by using the integral image generated in step S502 and by dividing the sum by the area of the rectangular area. The standard deviation can be calculated by calculating the sum of the square of the respective pixel values in the rectangular area by using the square integral image generated in step S502, dividing the sum by the area of the rectangular area, subtracting the square of the average described above from the calculated value so as to obtain the variance of the pixels in the rectangular area, and calculating the square root of the variance.

In step S505, a rectangular pattern is selected in accordance with a predetermined order from a database 506 holding the parameters for classification. In the database 506, the rectangular patterns and the parameters for classification corresponding thereto are held in advance in the order of the recording performed in step S415 at the above-described optimization of parameters for pattern classification. In step S505, one of the rectangular patterns is selected in accordance with the order.

In step S507, the sum in each rectangular area based on the rectangular pattern selected in step S505 is calculated by using the integral image used in step S503.

In step S508, by using the sums in the rectangular areas calculated in step S507 and the average and standard deviation calculated in step S504, the product of the area of the rectangular area and the average is subtracted from the sums in the respective rectangular areas. The obtained values are multiplied by the reciprocal of the standard deviation to perform normalization. Then, a vector is generated by arranging the sums in the same order as that in step S405 during the above-described parameter optimization for pattern classification in the rectangular pattern selected in step S505.

Then, in step S509, an inner product of the vector generated in step S508 and the class separating vector that corresponds to the rectangular pattern selected in step S505 and that is generated in advance by the optimization and is held in the database 506 is calculated. The class separating vector used here is directed so that if it is greater than a predetermined value it is classified into the face pattern class. Now, assume that the rectangular pattern selected in step S505 includes only one rectangular area and that the calculation of the variance-covariance matrix in step S409 is omitted in the above-described parameter optimization for pattern classification. In this case, the sign obtained in the calculation of the parameters in step S411 is multiplied by the vector (scalar) generated in step S508, and the product may be regarded as the inner product.

Then, in step S510, the inner product calculated in step S509 is compared with the classification threshold corresponding to the rectangular pattern selected in step S505, the classification threshold being calculated during optimization, and being held in the database 506. If the inner product is larger than the classification threshold, it is determined that there is a high possibility that a face exists at the point set in step S503. For the purpose of a rapid process, the process can be discontinued by determining that no face exists at the point set in step S503 based on the inner product calculated in step S509.

In that case, a discontinuance threshold corresponding to the rectangular pattern selected in step S505 is held in the database 506 in advance. If the inner product calculated in step S509 is equal to or smaller than the discontinuance threshold, the process is discontinued and the process skips to step S514. The discontinuance threshold is calculated as well as the classification threshold at the calculation of the parameters in step S411 in the above-described parameter optimization for pattern classification. For example, the discontinuance threshold may be calculated based on a condition that the percentage in which the process is discontinued due to wrong classification of a face pattern into the non-face pattern class is equal to or smaller than a predetermined value.

If it is determined in step S510 that there is a high possibility that a face exists, the classification score that corresponds to the rectangular pattern selected in step S505 and that is held in the database 506 is added to a present score in step S511. On the other hand, if it is determined in step S510 that there is no possibility that a face exists, the classification score is subtracted from the present score. For the purpose of increasing process speed, the process can be discontinued by determining that no face exists at the point set in step S503 based on the present score.

In that case, a score discontinuance threshold corresponding to scoring by the rectangular pattern selected in step S505 is held in the database 506. If the present score is equal to or lower than the score discontinuance threshold, the process is discontinued and the process proceeds to step S514. The score discontinuance threshold is obtained in the following manner. During the above-described parameter optimization for pattern classification, a score (0 in the initial state) is set for each of the learning patterns held in the database 403.

During the update of the weights of the learning patterns in step S416, the classification score is added to or subtracted from the score as in step S511. By using the score, the score discontinuance threshold may be calculated based on a condition as that in the above-described discontinuance threshold. In this embodiment, the process is discontinued based on the present score. Alternatively, as disclosed in the above-mentioned document "Rapid Object Detection using a Boosted Cascade of Simple Features", the process may be discontinued based on a cumulative value of several scores.

In step S512, it is determined whether all of the rectangular patterns held in the database 506 have been selected in step S505. If all of the rectangular patterns have been selected, the process proceeds to step S513. Otherwise, the process returns to step S505, where another rectangular pattern is selected in accordance with the predetermined order.

In step S513, it is determined that a face exists at the point set in step S503 if the score obtained by addition or subtraction in step S511 is equal to or larger than a predetermined value, and the result is recorded. The predetermined value used for the determination is typically 0, or may be appropriately set in accordance with a required performance of the face detecting method.

In step S514, it is determined whether all areas corresponding to all of the predetermined points have been extracted in step S503. If the all areas have been extracted, the process ends. Otherwise, the process returns to step S503, where another of the predetermined points is set so as to extract an area.

With the above-described process, a face in the input image can be detected. In this process, as in the first embodiment, a face having substantially the same orientation and size as those of the face patterns used at the learning is detected. If a face having a different orientation or size is to be detected, the method described in the first embodiment may be used.

As described above, in the second embodiment, which is a modification of the first embodiment, pattern classification into two classes is performed by using two-dimensional image data as input data, as in the first embodiment. The parameter optimization method used for pattern classification of higher accuracy and the pattern classification method using the same according to the second embodiment are realized by a combination of a plurality of weak discrimination methods established by using the boosting method.

Third Exemplary Embodiment

In the third embodiment, as a modification of the second embodiment, pattern classification into two classes is performed by using two-dimensional image data as input data, as in the second embodiment. The parameter optimization method used for pattern classification of higher accuracy and the pattern classification method using the same according to the third embodiment are realized by a combination of a plurality of weak discrimination methods established by using the boosting method.

In the second embodiment, linear classification is performed in a feature space defined by extracted sums. On the other hand, so-called nonlinear classification is performed in the third embodiment. That is, points in the feature space defined by extracted sums are mapped in a new feature space by a nonlinear transform, and linear classification is performed in the new feature space. As an example of the nonlinear classification, a method using a support vector machine (SVM) is described below (for details of the SVM, see the above-mentioned document "Technical Survey: Overview of Support Vector Machine").

Figure 6:
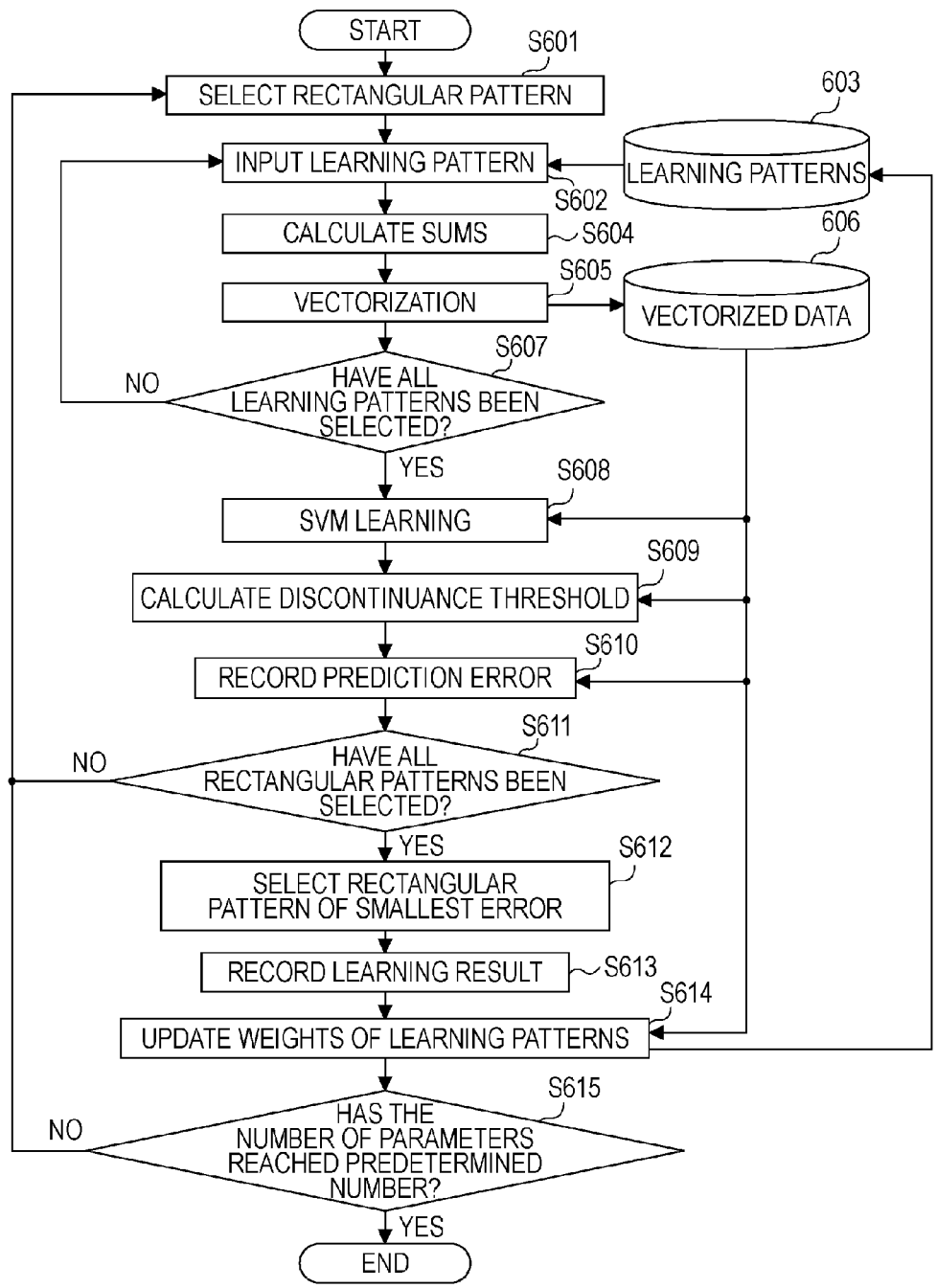
FIG. 6 is a flowchart showing a process of optimizing parameters for pattern classification according to a third exemplary embodiment.

FIG. 6 is a flowchart showing a process of the parameter learning method for pattern classification according to the third embodiment. Hereinafter, the parameter learning method for pattern classification is described with reference to FIG. 6.

Steps S601 to S607 are similar steps S401 to S407 according to the second embodiment except that the vectorization is different between steps S605 and S405. Thus, the corresponding description is omitted. In this embodiment, the score discontinuance threshold that is described in the second embodiment and that is used for discontinuing an operation by a cumulative score is also optimized. For this reason, every learning pattern held in a database 603 is allowed to have a cumulative score, which is initialized to 0 in the initial state.

In step S605, a vector is generated by using the sums in the respective rectangular areas calculated in step S604, as in step S405 in the second embodiment. The generated vector is held as vector data corresponding to the rectangular pattern selected in step S601 in a database 606. In the second embodiment, vectorization is performed after the sums in the respective rectangular areas are normalized by using only the average and standard deviation of luminance values of the learning pattern. However, in the third embodiment, vectorization is performed after dividing each of the normalized sums by the area of the corresponding rectangular area.

Then, in step S608, SVM learning is performed to separate groups of vector data obtained from a face pattern and a non-face pattern, respectively, the vector data being held in the database 606 and corresponding to the rectangular pattern selected in step S601.

In this embodiment, a nonlinear SVM using the Gaussian kernel $\exp(-|x-x_k|^2/\sigma^2)$ is used. In the optimization of the nonlinear SVM using the Gaussian kernel, at least one support vector $x_k$ of the same dimension as that of the vector data corresponding to the rectangular pattern selected in step S601, a coefficient $a_k$ corresponding thereto, and a bias value b can be obtained. That is, the number of dimensions is the same as the number of rectangular areas included in the rectangular pattern selected in step S601.

In a typical SVM, if n support vectors have been obtained, $\Sigma[a_k \cdot \exp(-|x-x_k|^2/\sigma^2)]+b$ ($\Sigma$ represents the sum of 1 to n) is calculated at classification, and binary determination is made in accordance with the sign. In this embodiment, however, a method for outputting a continuous certainty factor according to the value of $\Sigma[a_k \cdot \exp(-|x-x_k|^2/\sigma^2)]$ is used, and thus the bias value b obtained here can be ignored.

A constant determining the degree of soft margin and σ of the Gaussian kernel, which are required during optimization of the SVM, may be appropriately set in accordance with a range of vector data groups performing the SVM optimization or the complexity of a problem. In this optimization, it is difficult to directly use the weights of the learning patterns, unlike in the second embodiment. Therefore, when the weights of the learning patterns should be reflected on the optimization, whether the weights are used as data for the SVM optimization is determined in accordance with the probability proportional to the weights, for example.

In step S609, a discontinuance threshold used to speed up a process in the face detecting method described below is calculated. The discontinuance threshold corresponds to the discontinuance threshold described above in the determination of threshold in step S510 in the face detecting method according to the second embodiment. Specifically, all vector data x corresponding to the rectangular pattern selected in step S601 held in the database 606 is a target.

On the other hand, $\Sigma[a_k \cdot \exp(-|x-x_k|^2/\sigma^2)]$ is calculated by using the n support vectors $x_k$ and the coefficient $a_k$ corresponding thereto obtained in step S608, and the parameter σ used during optimization. The value obtained by the calculation is called an intermediate output value. Based on the intermediate output value obtained from the all vector data, a discontinuance threshold is calculated. The discontinuance threshold is used to discontinue the process by classifying a pattern into the non-face pattern class if the corresponding intermediate output value is equal to or smaller than the predetermined value.

The discontinuance threshold can be calculated in the same manner as in step S510 according to the second embodiment. For example, the discontinuance threshold may be calculated based on a condition that the percentage in which the process is discontinued by wrong classification of a face pattern into the non-face pattern class is equal to or smaller than a predetermined value.

In this embodiment, a second condition is also used in addition to the above-described condition. In the second condition, the percentage in which the process is discontinued by correct classification of a non-face pattern into the non-face pattern class is equal to or higher than a second predetermined value. A value that satisfies both conditions at the same time and that realizes the highest percentage in which the process is discontinued in the second condition is searched for and is determined. If there is no value that satisfies both conditions at the same time, the process is not discontinued at classification.

In step S610, a prediction error is calculated by using the parameters obtained in step S608 and is recorded. Specifically, as in step S609, all the vector data x that are held in the database 606 and that corresponds to the rectangular pattern selected in step S601 are targets. For the vector data x, all intermediate output values are calculated by using the n support vectors $x_k$, the corresponding coefficient $a_k$ obtained in step S608, and the parameter σ used during optimization.

Then, weighted histograms for the respective classes are generated by using all the intermediate output values and the weights of the respective learning patterns. In the weighted histogram of each class, accumulation of the weights of the patterns in the class within a range of the intermediate output value corresponding to a bin is expressed as the value of the bin. By using the generated weighted histogram of each class, a prediction error is calculated and is recorded. When the value of the k-th bin (the range of intermediate output value corresponding to the bin needs to be the same among the classes) is $S_{k,c}$ (c represents a class) and when the number of all bins is n in the weighted histogram of each class, the prediction error can be obtained as $2 \cdot \Sigma[(S_{k,Face} \cdot S_{k,NonFace})^{1/2}]$.

In step S611, as in step S413 according to the second embodiment, it is determined whether all of the predetermined rectangular patterns have been selected in step S601. If not all of the rectangular patterns have been selected, the selection history of the learning patterns is cleared and the process returns to step S601, where another rectangular pattern is selected. If it is determined that all of the predetermined rectangular patterns have been selected, the process proceeds to step S612.

In step S612, the rectangular pattern having the smallest prediction error is selected based on the prediction errors recorded in step S610 of the rectangular patterns selected in step S601.

In step S613, the parameters for pattern classification are sequentially recorded as parameters used in the weak discrimination method. First, the rectangular pattern selected in step S612, the support vector $x_k$, the corresponding coefficient $a_k$ obtained in step S608, and the parameter σ used during optimization are recorded. Furthermore, the discontinuance threshold obtained in step S609 and a classification score table T generated based on the weighted histogram of each class in step S610 are recorded.

The classification score table T outputs an output value to the value of the bin of the weighted histogram of each class when the intermediate output value is within the range of intermediate output value corresponding to the bin of the weighted histogram of each class. By using the values of the bin $S_{i,Face}$ and $S_{i,NonFace}$, an output value $\alpha = 1/2 \cdot \ln\{(S_{i,Face}+\epsilon)/(S_{i,NonFace}+\epsilon)\}$ is output.

In step S614, the weights of the learning patterns held in the database 603 are updated. At the same time, the score discontinuance threshold to discontinue the operation based on the score described above in the face detecting method according to the second embodiment is calculated. For this purpose, the cumulative scores of the respective learning patterns are updated and the score discontinuance threshold is calculated accordingly.

In the updating of the weights, all vector data that is held in the database 606 and that corresponds to the rectangular pattern recorded in step S613 is used. Also, the parameters for pattern classification recorded in step S613 (support vector $x_k$, corresponding coefficient $a_k$, parameter σ used during optimization, and classification score table T) are used. First, the intermediate output value $\Sigma[a_k \cdot \exp(-|x-x_k|^2/\sigma^2)]$ is calculated. Based on this value, an output value α is obtained by referring to the classification score table T.

If the learning pattern is a face pattern, the weight thereof is multiplied by $\exp(-\alpha)$. If the learning pattern is a non-face pattern, the weight thereof is multiplied by $\exp(\alpha)$. In the update of the cumulative scores, the output value α obtained above is added to the cumulative scores of the learning patterns. The score discontinuance threshold is calculated by searching for the score discontinuance threshold satisfying a condition as in step S609. If the score discontinuance threshold satisfying the condition exists, the value is added to the parameters for pattern classification recorded in step S613 and is recorded. As in the second embodiment, normalization is performed so that the sum of the weights of all the learning patterns held in the database 603 becomes 1 after the above-described update of the weights.

Finally, in step S615, it is determined whether the number of the parameters of the weak discrimination method recorded in step S613 has reached the predetermined number, as in step S417 according to the second embodiment. If the number has reached the predetermined number, the process ends. Otherwise, the rectangular pattern selection history, the learning pattern selection history, and the vectorized data in the database 606 are cleared and the process returns to step S601, where a rectangular pattern is selected.

With the above-described method, the parameters for pattern classification, that is, a predetermined number of rectangular patterns and parameters for pattern classification corresponding to the rectangular patterns, can be obtained as parameters of each weak discrimination method.

As described above, not only linear classification described in the first and second embodiments but also nonlinear classification can be used. In this embodiment, the method based on the nonlinear SVM using Gaussian kernel is described. However, the present invention is not limited to this method. A method based on an SVM using polynomial kernel, another nonlinear method such as nonlinear discriminant analysis, and a method based on a k-nearest neighbor method can be applied as alternatives.

Figure 7:
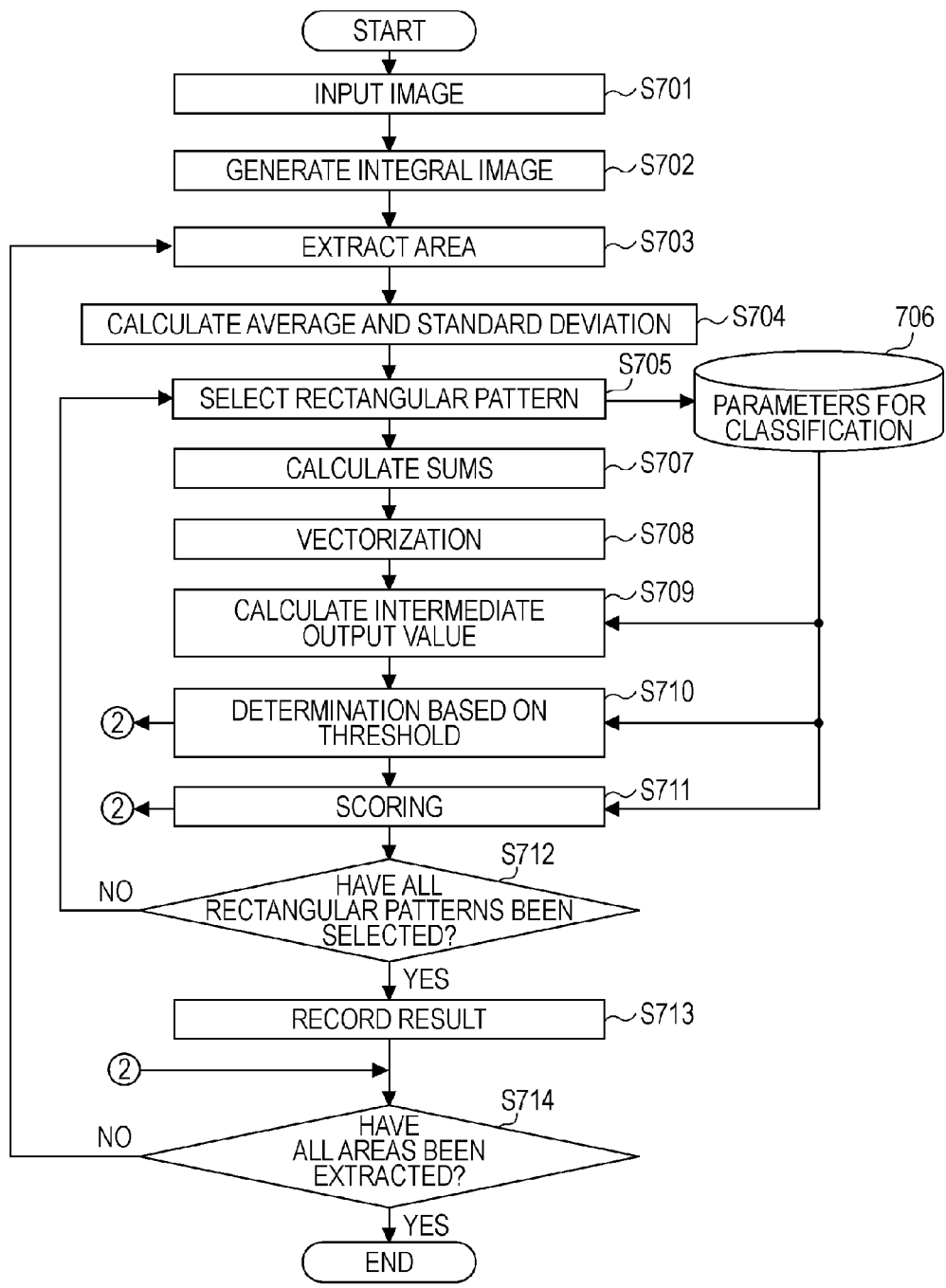
FIG. 7 is a flowchart showing a face detecting process according to the third embodiment.

Next, a method for detecting a face from an image is described with reference to FIG. 7. This method uses a pattern classification method based on a combination of a plurality of weak discrimination methods, using the parameters for pattern classification in the weak discrimination method obtained in the above-described manner.

Steps S701 to S707 are similar to steps S501 to S507 according to the second embodiment, and thus the corresponding description is omitted.

In step S708, the sums in the rectangular areas calculated in step S707 and the average and standard deviation calculated in step S704 are used, the product of the area of the rectangular area and the average is subtracted from each of the sums in the respective rectangular areas, and the obtained values are multiplied by the reciprocal of the standard deviation, so that normalization is performed. The respective normalized values are divided by the area of the corresponding rectangular area, and the obtained values are arranged in the same order as that in step S605 at the above-described parameter learning for pattern classification in the rectangular pattern selected in step S705, so that a vector is generated.

In step S709, the intermediate output value $\Sigma[a_k \cdot \exp(-|x-x_k|^2/\sigma^2)]$ is calculated, using the vector generated in step S708, the support vector $x_k$ that is generated by the optimization and is held and that corresponds to the rectangular pattern selected in step S705, the corresponding coefficient $a_k$, and the parameter $\sigma$.

In step S710, the intermediate output value calculated in step S709 is compared with the discontinuance threshold that is calculated in the optimization and is held in a database 706 and that corresponds to the rectangular pattern selected in step S705. If the intermediate output value is smaller than the discontinuance threshold, the process is discontinued by determining that a face does not exist at the point set in step S703, and the process proceeds to step S714.

In step S711, the output value $\alpha$ is calculated by using the intermediate output value calculated in step S709 and the classification score table T that is held in the database 706 and that corresponds to the rectangular pattern selected in step S705. Then, the output value $\alpha$ is added to the score that is set to 0 in step S703. Also, the score added with the value $\alpha$ is compared with the score discontinuance threshold that is calculated during optimization and that corresponds to the end of scoring by the rectangular pattern selected in step S705. If the score added with the value $\alpha$ is smaller than the score discontinuance threshold, the process is discontinued by determining that a face does not exist at the point set in step S703, and the process proceeds to step S714.

Steps S712 to S714 are the same as step S512 to S514 according to the second embodiment, and thus the corresponding description is omitted.

With the above-described process, a face in the input image can be detected. In this process, as in the face detecting method according to the first embodiment, a face having substantially the same orientation and size as those of the face patterns used at the optimization state is detected. If a face having different orientation and size is to be detected, the method described in the first embodiment may be used.

As described above, in the third embodiment, which is a modification of the second embodiment, pattern classification into two classes is performed by using two-dimensional image data as input data, as in the second embodiment. The parameter learning method used for pattern classification of higher accuracy and the pattern classification method using the same according to the third embodiment are realized by a combination of a plurality of weak discrimination methods performing nonlinear classification established by using the boosting method.

Fourth Exemplary Embodiment

In the fourth embodiment, as a modification of the second embodiment, two-dimensional image data is used as input data and it is determined whether the input image data belongs to any of a plurality of predetermined categories or none of the categories. That is, the input image data is classified into a class corresponding to a plurality of predetermined categories or a class where the input image data belongs to none of the categories. This is called multi-class pattern classification. Hereinafter, a parameter optimization method used for pattern classification and a pattern classification method using the same realized by a combination of a plurality of weak discrimination methods established by using the boosting method are described.

As the plurality of predetermined categories, various things can be used, for example, a human face as in the first to third embodiments, a vehicle, flower, and so on. In this embodiment, the face of an individual is regarded as a category, and the categories of predetermined registered people (e.g., three people) are used.

Figure 8:
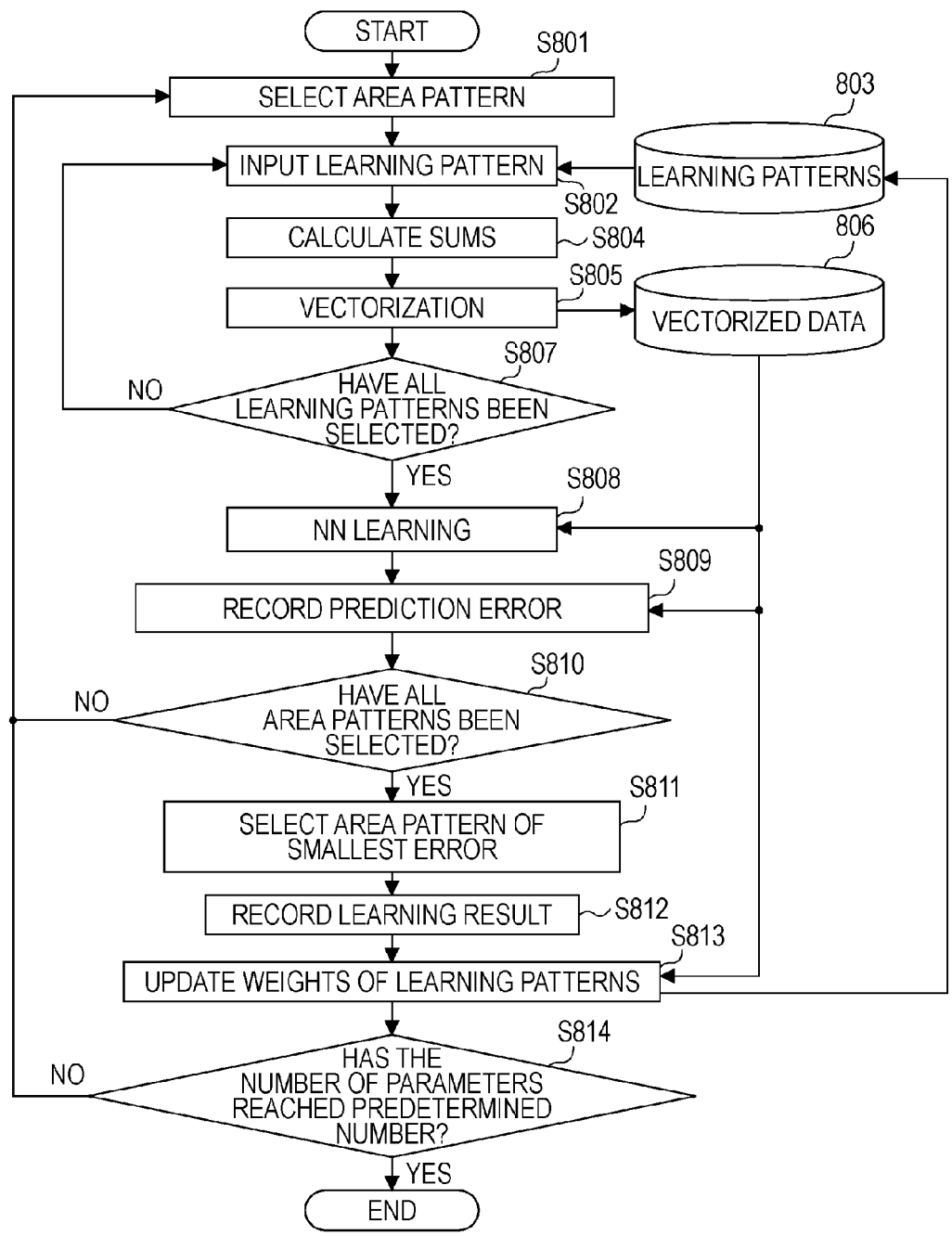
FIG. 8 is a flowchart showing a process of optimizing parameters for pattern classification according to a fourth exemplary embodiment.

FIG. 8 is a flowchart showing an example process of the parameter optimization method for pattern classification according to the fourth embodiment. Hereinafter, the parameter optimization method for pattern classification is described with reference to FIG. 8.

First, in step S801, one of a plurality of predetermined area patterns is selected. In the first to third embodiments, rectangular patterns each including rectangular areas are used to rapidly perform pattern classification in a computer. The area pattern, that is, a combination of predetermined parts in each of which the sum is extracted, may include arbitrary parts, for example, predetermined concentric circles. In that case, the sum of data in each circle is calculated.

Figure 10:
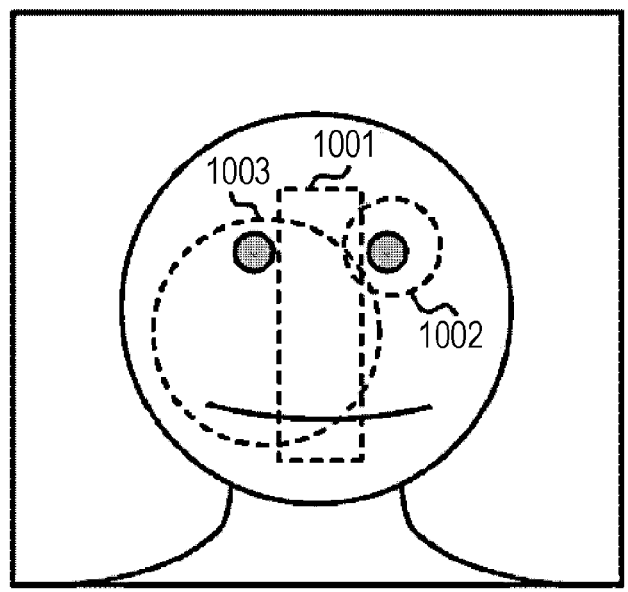
FIG. 10 shows an example of an area pattern.

In this embodiment, a plurality of area patterns are prepared, each area pattern including three areas 1001 to 1003 as shown in FIG. 10, and one of the area patterns is selected. The area 1001 is a rectangular area having an arbitrary size and position, and the areas 1002 and 1003 are circular areas (the two areas are different from each other) having an arbitrary size and position.

In step S802, one of learning patterns held in a database 803 is input. The database 803 holds a plurality of face patterns of each of three registered people A, B, and C and a plurality of face patterns of a non-registered person, together with their labels (information indicating any of A, B, and C or the non-registered person) and the weights of the respective patterns. The weights of the patterns are initialized as in the second embodiment.

In the initial setting of the weights, the weights of the learning patterns of A, B, and C can be the same. In this embodiment, too, the face patterns held in the database 803 are grayscale images, and the respective pixel values are represented as luminance values. All of the face patterns are normalized in the orientation and size of the face to some extent, and the image size thereof is uniform.

In step S804, based on the area pattern selected in step S801, the sum of luminance values in each area of the area pattern is extracted from the learning pattern input in step S802.

In step S805, the sums of the respective areas obtained in step S804 are simply arranged to generate a vector, and the vector is held as vector data corresponding to the area pattern selected in step S801 in a database 806. In this embodiment, normalization of the sums using the average and standard deviation of the learning pattern is not performed unlike in the second and third embodiments. Alternatively, vectorization can be performed after normalization.

In step S807, it is determined whether all of the learning patterns held in the database 803 have been selected. If not all of the learning patterns have been selected, the process returns to step S802, where another learning pattern is selected from the database 803. If all of the learning patterns have been selected, the process proceeds to step S808.

In step S808, neural network (NN) learning is performed by using the vector data that is held in the database 806 and that corresponds to the area pattern selected in step S801 and the label thereof. Any type of network can be used as the NN as long as multi-class classification can be performed. In this embodiment, an NN of a three-layer feedforward type as shown in FIG. 11 is used.

This NN includes an input layer 1101, which includes three input nodes 1102 (the number depends on the number of areas included in the area pattern), and an output layer 1105, which includes three output nodes 1106 (the number depends on the number of categories). The number of intermediate nodes 1104 in an intermediate layer 1103 may be set to a predetermined number, but is experimentally set to an appropriate number in accordance with a problem.

Figure 11:
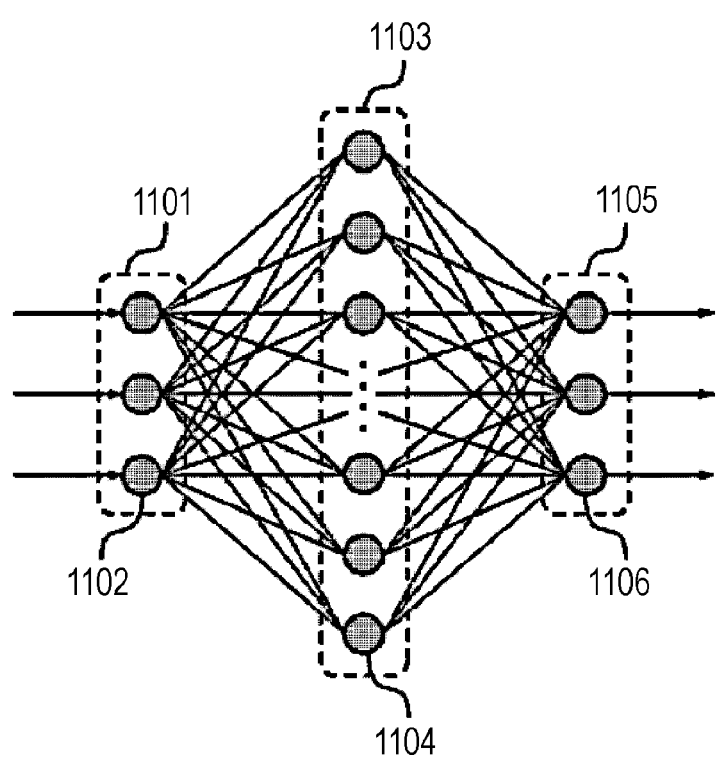
FIG. 11 shows an example of a neural network.

As shown in FIG. 11, the intermediate nodes 1104 are coupled to all of the input nodes 1102, and the output nodes 1106 are coupled to all of the intermediate nodes 1104. In the NN learning process, the values of respective elements of the vector data that are held in the database 806 and that correspond to the area pattern selected in step S801 are input to the three nodes 1102 in the input layer 1101. Then, so-called supervised learning is repeatedly performed by using a back-propagation method so that the output of the output node 1106 corresponding to the label of the input vector data is 1 and that the output of the other output nodes 1106 is 0.

If the vector data does not belong to any of the categories A, B, and C, supervised learning is performed so that the output of all of the three output nodes is 0 (for details of the multi-layer feedforward NN and the supervised learning method of NN, such as the backpropagation method, see S. Haykin, "Neural Networks A comprehensive Foundation $2^{nd}$ Edition", Prentice Hall, pp. 156-255, July 1998). In order to allow the weights of the learning patterns to be reflected on a learning result as in the second embodiment, the probability of presenting patterns at the learning stage may be set to the probability proportional to the weights of the learning patterns.

In step S809, an operation is actually performed by the NN by using the parameters of the NN obtained through the learning process in step S808, and a prediction error obtained from the result is calculated and is recorded. Specifically, an operation is actually performed by the NN on all vector data x that is held in the database 806 and that corresponds the area pattern selected in step S801 by using the parameters of the NN obtained in step S808. Then, all output results of the NN (output values of the three output nodes) are calculated.

Then, by using all the output results, actual determination is made by changing respective determination thresholds in small steps (if the output value is equal to or larger than the threshold, it is determined there is a high possibility that the input data belongs to the class corresponding to the node). In the actual determination, the output values of the respective output nodes are compared with the determination threshold. If the output value does not exceed the determination threshold in all of the nodes, it is determined that the input data does not belong to any class. If the output value exceeds the determination threshold in one of the nodes, it is determined that the input data belongs to the class corresponding to the node.

If the output value exceeds the determination threshold in many nodes, it is determined that the input data belongs to the class corresponding the node outputting the largest value. In the comparison of the output values, the absolute values thereof may be compared with each other or the differences between the determination threshold and the respective output values may be compared with each other.

According to the determination, the weights of the learning patterns where a wrong determination has been made (the pattern belonging to class A is classified into one of the other classes) are accumulated as a prediction error. Then, the prediction error is calculated in various combinations of determination thresholds, and three determination thresholds having the smallest prediction error and the prediction error at that time are recorded.

In step S810, it is determined whether all of the predetermined area patterns have been selected in step S801, as in step S413 according to the second embodiment. If not all of the area patterns have been selected, the learning pattern selection history is cleared and the process returns to step S801, where another area pattern is selected. If all of the predetermined area patterns have been selected, the process proceeds to step S811.

In step S811, the area pattern having the smallest prediction error is selected by referring to the prediction errors of the area patterns selected in step S801 recorded in step S809.

In step S812, the area pattern having the smallest prediction error selected in step S811 and the parameters of the NN obtained in step S808 at the selection of the area pattern are sequentially recorded as parameters of the weak discrimination method. Herein, the parameters of the NN include a coupling coefficient of the NN and the number of nodes in the intermediate layer. Furthermore, the respective determination thresholds obtained in step S809 and the classification score α calculated based on the prediction error are recorded as parameters of the weak discrimination method. The classification score α can be calculated by using the expression $\alpha = 1/2 \times \ln\{(1-\epsilon)/\epsilon\}$, where $\epsilon$ is the predictive error, as in the second embodiment.

In step S813, the weights of the learning patterns held in the database 803 are updated. In the update of the weights, all vector data that is held in the database 806 and that corresponds to the area pattern having the smallest prediction error recorded in step S812 is the target. By using the parameters for pattern classification (the coupling coefficient of the NN, the number of nodes in the intermediate layer, and the respective determination thresholds) recorded in step S812, determination is actually performed by the NN. If the learning pattern is correctly classified, the weight thereof is multiplied by $\exp(-\alpha)$ by using the classification score α. If the learning pattern is wrongly classified, the weight thereof is multiplied by $\exp(\alpha)$.

Finally, in step S814, as in step S417 according to the second embodiment, it is determined whether the number of the parameters of the weak discrimination method recorded in step S812 has reached the predetermined number. If the number reached the predetermined number, the process ends. Otherwise, the area pattern selection history, the learning pattern selection history, and the vectorized data in the database 806 are cleared and the process returns to step S801, where an area pattern is selected. With this method, the parameters for pattern classification, including the predetermined number of area patterns and the parameters for pattern classification corresponding to the area patterns, can be obtained as parameters of each weak discrimination method.

Figure 9:
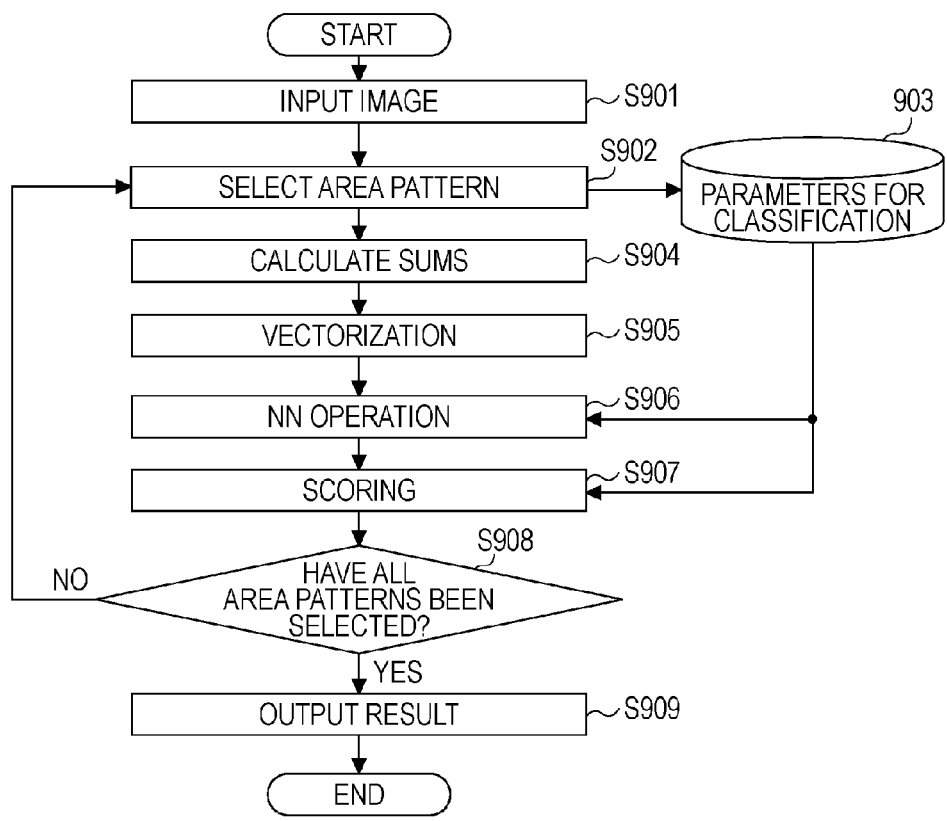
FIG. 9 is a flowchart showing a face detecting process according to the fourth embodiment.

Hereinafter, an individual identifying method using the pattern classification method based on a combination of a plurality of weak discrimination methods, using the parameters for pattern classification of the weak discrimination method obtained in the above-described method is described with reference to FIG. 9. According to this individual identifying method, it is detected whether an input face image is any of registered people A, B, and C or a non-registered person.

First, in step S901, a face pattern as a face image to be classified is input. At this time, the score of each class (three classes: class A, class B, and class C) used in the classification is initialized to 0. The input image is a grayscale image as in the above-described parameter optimization for pattern classification and is normalized to the same size. When individual identification is to be performed by using a face image other than the grayscale image, the image may be input after being transformed to a grayscale image of the same image size as that in the learning.

Then, in step S902, an area pattern is selected in accordance with the predetermined order from a database 903 holding parameters for classification. The area patterns and the parameters for classification corresponding to the area patterns are held in advance in the database 903 in accordance with the order of the recording in step S812 during parameter optimization for pattern classification. In step S902, an area pattern is selected in accordance with the order.

In step S904, the sum of luminance values is calculated in each area of the area pattern selected in step S902 in the image input in step S901.

Then, in step S905, the sums of the respective areas calculated in step S904 are arranged in the same order as in step S805 in the above-described parameter optimization for pattern classification, so as to generate a vector.

In step S906, the output values of all nodes in the output layer are calculated. At that time, the vector generated in step S905, the coupling coefficient of the NN corresponding to the area pattern selected in step S902, the coefficient being generated in the learning and held in the database 903, and the NN of the number of nodes in the intermediate layer are used.

Then, in step S907, the output values of all nodes obtained in step S906 are compared with the determination threshold of each output node corresponding to the area pattern selected in step S902, the threshold being obtained at the optimization stage. The determination is made in the same manner as in step S809 in the above-described parameter optimization for pattern classification.

Then, the classification score corresponding to the area pattern selected in step S902 held in the database 903 is added to the score of the determined class. On the other hand, the classification score is subtracted from the score of the class other than the determined class. If it is determined that the input data does not belong to any of the classes, the classification score is subtracted from all of the scores.

In step S908, it is determined whether all of the area patterns held in the database 903 have been selected in step S902. If all of the area patterns have been selected, the process proceeds to step S909 to output a result. Otherwise, the process returns to step S902, where another area pattern is selected in accordance with the predetermined order.

In step S909, it is determined whether the face pattern input in step S901 belongs to one of the classes by using the scores of the respective classes added or subtracted in step S907, and the result is output. In this determination, the score of the class having the largest output value is selected from among the scores. If the score is equal to or larger than a predetermined value, it is determined that the input face pattern belongs to the class. Otherwise, it is determined that the input face pattern does not belong to any class. The predetermined value is typically 0, but can be appropriately set in accordance with the performance of the individual identifying method based on the face image to be obtained.

As described above, in the fourth embodiment, as a modification of the second embodiment, two-dimensional image data is used as input data, and it is determined whether the image data belongs to any of predetermined categories or none of the categories. That is, the input image data is classified into one class corresponding to a plurality of predetermined categories and one class where the input image data belongs to none of the categories. Accordingly, multi-class pattern classification is performed. The parameter optimization method used for pattern classification and the pattern classification method using the same according to the fourth embodiment are realized by combining a plurality of weak discrimination methods for performing classification by NN established by using the boosting method.

As in the above-described fourth embodiment, in the multi-class pattern classification, a multi-class classification method may be used as one of a plurality of weak discrimination methods. Alternatively, multi-class classification may be performed by using a plurality of two-class pattern classification methods, which are described in the second and third embodiments.

In the second to fourth embodiments, the pattern classification method using a plurality of same weak discrimination methods is described. However, respective weak discrimination methods may be mixed. Also, a different weak discrimination method may be used together.

Figure 12:
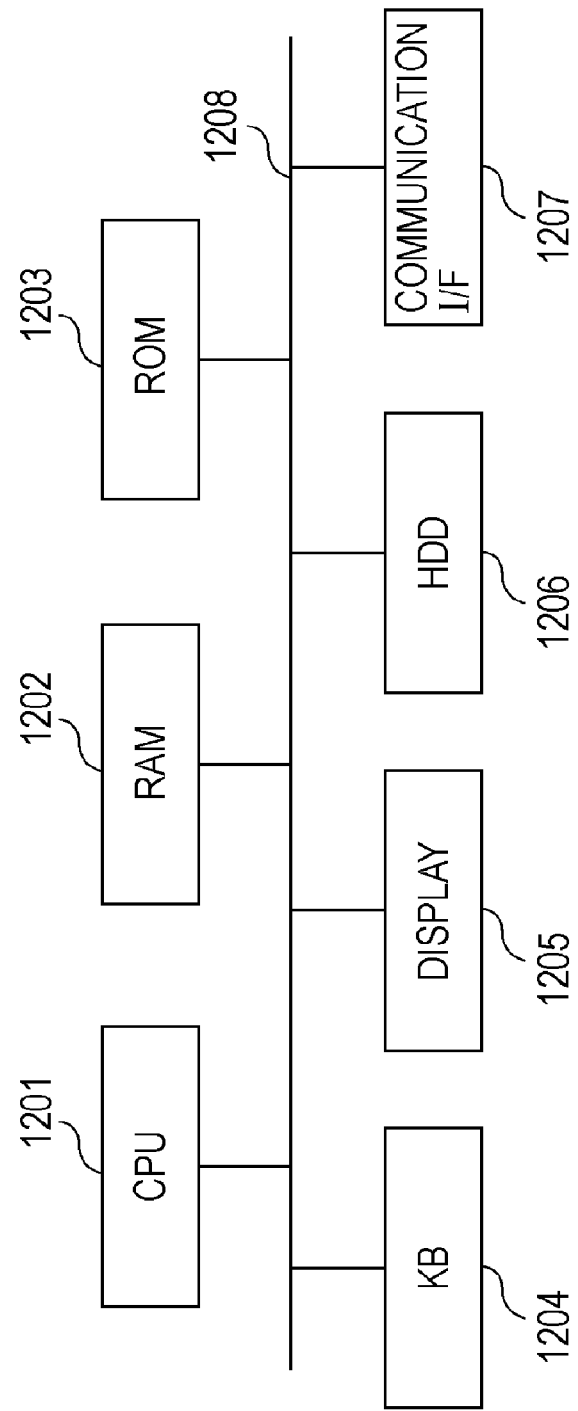
FIG. 12 is a block diagram showing an example hardware configuration of a parameter learning/optimization apparatus and a pattern classification apparatus according to each of the embodiments.

FIG. 12 is a block diagram showing a hardware configuration of a parameter optimization apparatus and a pattern classification apparatus according to each of the above-described embodiments.

In FIG. 12, a CPU (central processing unit) 1201 executes various programs including the processes described in the flowcharts and controls each unit connected via a system bus 1208. A RAM (random access memory) 1202 temporarily stores data and programs. A ROM (read only memory) 1203 stores fixed data and programs. A keyboard 1204 includes keys used to input characters and select a function. Also, a mouse is provided as a pointing device to indicate a position on a display.

A display 1205 displays patterns to be classified and a classification result and provides a user interface (UI). A hard disk drive (HDD) 1206 is a device to permanently store programs and data. Also, a storage device using a storage medium, such as a DVD (digital versatile disc), a CD (compact disc), or an FD (flexible disk), may be provided. A communication interface (I/F) 1207 is an interface used to communicate with an external apparatus via a LAN (local area network) or the Internet. The system bus 1208 is used to connect the above-described units with each other and is used as a medium to transmit/receive data, addresses, and control signals.

The various programs including the processes described in the flowcharts may be stored in the ROM 1203 or may be loaded from the HDD 1206 to the RAM 1202 as necessary prior to or during the process.

The pattern to be classified can be obtained by reading it from the storage device such as the HDD 1206 or by receiving it from an external image pickup apparatus via the communication I/F 1207.

The present invention can be applied to a system including a plurality of apparatuses or to a single apparatus.

Other Exemplary Embodiments

The embodiments of the present invention can be achieved when a computer of the system or the apparatus supplied with a storage medium storing program code of software realizing the functions of the above-described embodiments reads and executes the program code.

In that case, the program code itself read from the storage medium realizes the functions of the above-described embodiments, and thus the storage medium storing the program code is included in the present invention. Also, part or all of actual processes may be performed by an operating system operating in the computer based on instructions of the program code read by the computer, and the processes may realize the functions of the above-described embodiments.

The program code read from the storage medium may be written on a memory provided in a function expansion card inserted into the computer or a function expansion unit connected to the computer. A CPU or the like provided in the function expansion card or the function expansion unit may perform part or all or the actual processes based on the instructions of the program code so as to realize the functions of the above-described embodiments.

When the present invention is applied to the above-described storage medium, the storage medium stores the program code corresponding to the above-described flowcharts.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

This application claims the benefit of Japanese Application No. 2006-181896 filed Jun. 30, 2006, which is hereby incorporated by reference herein in its entirety.

What is claimed is:

1. A computer-implemented method to optimize parameters for classifying input data into one of a plurality of classes, the method comprising:
  inputting a plurality of pieces of learning data, each associated with a class to which the piece of the learning data belongs;
  calculating a statistical amount of attribute values of elements in each of specific k parts, k being equal to or larger than 1, in each piece of the learning data;
  mapping each piece of the learning data in a k-dimensional feature space as a vector having the calculated k statistical amounts as elements;
  calculating a first parameter which defines a classification function based on vectors obtained by mapping the learning data; and
  optimizing a second parameter which defines a boundary value of the classification function to classify the input data into one of the plurality of classes in the k-dimensional feature space by trying to classify the vectors with each of a plurality of candidates for the boundary value and selecting one of the candidates which minimize an error of a class in which the vectors are classified using the candidate against the class to which the learning data corresponding to the vectors belong.

2. The method according to claim 1, wherein the input data is an image and the elements are pixels.

3. The method according to claim 2, wherein the attribute values are luminance values.

4. The method according to claim 1, wherein the statistical amount is a sum.

5. The method according to claim 1, wherein the optimizing is performed in accordance with a weight of the learning data.

6. The method according to claim 5, wherein a plurality of classification parameters are obtained by repeatedly performing the optimizing by updating the weight.

7. The method according to claim 1, wherein the mapping normalizes the k statistical amounts based on at least one of a statistics amount of the learning data and the size of each of the k parts.

8. The method according to claim 1, wherein the optimizing includes,
  mapping each piece of the learning data mapped in the k-dimensional feature space in a new feature space by nonlinear transform; and
  obtaining a linear classification function and a parameter defining a boundary between classes in the new feature space based on the plurality of pieces of learning data mapped in the new feature space.

9. The method according to claim 8, wherein, assuming that the learning data is x and that the nonlinear transform is $\phi(x)$, $\phi(x)^T\phi(x')=K(x,x')$ is satisfied by using a function $K(x, x')$.

10. A pattern classification method for classifying input data into one of a plurality of classes, the pattern classification method comprising:
  a parameter input step of inputting the parameters optimized in the method according to claim 1;
  a target data input step of inputting data to be classified;
  a second calculating step of calculating a statistical amount of attribute values of elements in each of parts positioned at the same position as the k parts in the data to be classified; and
  a classifying step of classifying the data to be classified into one of the plurality of classes by using the parameters input in the parameter input step and the k statistical amounts calculated in the second calculating step.

11. A pattern classification method for classifying input data into one of a plurality of classes based on discrimination by a plurality of weak discrimination methods, the pattern classification method comprising, in at least one of the plurality of weak discrimination methods:
  a parameter input step of inputting the parameters optimized in the method according to claim 1;
  a target data input step of inputting data to be classified;
  a second calculating step of calculating a statistical amount of elements in each of parts positioned at the same position as the k parts in the data to be classified; and
  an output step of outputting a result indicating which of the plurality of classes has the highest possibility that the data to be classified belongs to it, by using the parameters input in the parameter input step and the k statistical amounts calculated in the second calculating step.

12. The pattern classification method according to claim 11, wherein a combination of the plurality of weak discrimination methods is established by using a boosting method.

13. The pattern classification method according to claim 12, wherein, in establishment of the combination of the plurality of weak discrimination methods by the boosting method, the weak discrimination method having the highest classifying performance is selected from among the plurality of weak discrimination methods using the k parts.

14. The pattern classification method according to claim 11, wherein the data to be classified is classified into a specific class based on the possibility that the data belongs to a given one of the plurality of classes in one of the weak discrimination methods, and discrimination by the other weak discrimination methods is stopped.

15. The pattern classification method according to claim 11, further comprising a step of updating a cumulative value indicating the possibility that the data belongs to a given one of the plurality of classes in accordance with the possibility that the data belongs to said given one of the plurality of classes.

16. The pattern classification method according to claim 13, further comprising:
a generating step of generating cumulative data of the data to be classified, the part being a rectangular area,
wherein the second calculating step calculates the sum by using the cumulative data.

17. An apparatus for optimizing parameters to classify input data into one of a plurality of classes, the apparatus comprising:
a learning data input unit configured to input a plurality of pieces of learning data, each associated with a class to which the piece of the learning data belongs;
a calculating unit configured to calculate a statistical amount of attribute values of elements in each of specific k parts, k being equal to or larger than 1, in each piece of the learning data;
a mapping unit configured to map each piece of the learning data in a k-dimensional feature space as a vector having the calculated k statistics amounts as elements;
a second calculating unit configured to calculate a first parameter which defines a classification function based on vectors obtained by mapping the learning data; and
a unit configured to optimize classification a second parameter which defines a boundary value of the classification function to classify the input data into one of the plurality of classes in the k-dimensional feature space by trying to classify the vectors with each of a plurality of candidates for the boundary value and selecting one of the candidates which minimize an error of a class in which the vectors are classified using the parameters against the class to which the learning data corresponding to the vectors belong.

18. A pattern classification apparatus for classifying input data into one of a plurality of classes, the pattern classification apparatus comprising:
a parameter input unit configured to input the parameters optimized by the apparatus according to claim 17;
a target data input unit configured to input data to be classified;
a second calculating unit configured to calculate a statistical amount of elements in each of parts positioned at the same position as the k parts in the data to be classified; and
a classifying unit configured to classify the data to be classified into one of the plurality of classes by using the parameters input by the parameter input unit and the k statistical amounts calculated by the second calculating unit.

19. A pattern classification apparatus for classifying input data into one of predetermined classes based on discrimination by a plurality of weak discriminators, the pattern classification apparatus comprising, in at least one of the plurality of weak discriminators:
a parameter input unit configured to input the parameters optimized by the apparatus according to claim 17;
a target data input unit configured to input data to be classified;
a second calculating unit configured to calculate a statistical amount of elements in each of parts positioned at the same position as the k parts in the data to be classified; and
an output unit configured to output a result indicating which of the plurality of classes has the highest possibility that the data to be classified belongs to it by using the parameters input by the parameter input unit and the k statistics amounts calculated by the second calculating unit.

20. A non-transitory computer-readable medium containing computer-executable instructions for controlling a computer to perform parameter optimization for classifying input data into one of a plurality of classes, the medium comprising:
computer-executable instructions for inputting a plurality of pieces of learning data, each associated with a class to which the piece of the learning data belongs;
computer-executable instructions for calculating a statistical amount of attribute values of elements in each of specific k parts, k being equal to or larger than 1, in each piece of the learning data;
computer-executable instructions for mapping each piece of the learning data in a k-dimensional feature space as a vector having the calculated k statistical amounts as elements;
computer-executable instructions for calculating a first parameter which defines a classification function based on vectors obtained by mapping the learning data; and
computer-executable instructions for optimizing a second parameter which defines a boundary value of the classification function to classify the input data into one of the plurality of classes in the k-dimensional feature space by trying to classify the vectors with each of a plurality of candidates for the boundary value and selecting one of the candidates which minimize an error of a class in which the vectors are classified using the candidate against the class to which the learning data corresponding to the vectors belong.

\* \* \* \* \*